(12) United States Patent
Jang et al.

(10) Patent No.: US 8,665,759 B2
(45) Date of Patent: *Mar. 4, 2014

(54) MULTIPLE SUBSCRIBER VIDEOCONFERENCING SYSTEM

(75) Inventors: Saqib Jang, Woodside, CA (US); Mark Kent, Los Altos Hills, CA (US)

(73) Assignee: Margalla Communications, Inc., Woodside, CA (US)

( * ) Notice: Subject to any disclaimer, the term of this patent is extended or adjusted under 35 U.S.C. 154(b) by 1483 days.

This patent is subject to a terminal disclaimer.

(21) Appl. No.: 11/236,121

(22) Filed: Sep. 26, 2005

(65) Prior Publication Data

US 2006/0023644 A1 Feb. 2, 2006

Related U.S. Application Data

(63) Continuation of application No. 09/819,548, filed on Mar. 26, 2001, now Pat. No. 6,980,526.

(60) Provisional application No. 60/191,819, filed on Mar. 24, 2000.

(51) Int. Cl.
*H04L 12/16* (2006.01)

(52) U.S. Cl.
USPC .......................................... 370/261; 370/260

(58) Field of Classification Search
None
See application file for complete search history.

(56) References Cited

U.S. PATENT DOCUMENTS

| | | |
|---|---|---|
| 5,515,099 A | 5/1996 | Cortjens et al. |
| 5,526,037 A | 6/1996 | Cortjens et al. |
| 5,528,289 A | 6/1996 | Cortjens et al. |
| 5,568,183 A | 10/1996 | Cortjens et al. |
| 5,583,565 A | 12/1996 | Cortjens et al. |
| 5,598,209 A | 1/1997 | Cortjens et al. |
| 5,689,553 A | 11/1997 | Ahuja et al. |
| 5,838,664 A | 11/1998 | Polomski |
| 5,867,494 A | 2/1999 | Krishnaswamy et al. |
| 5,867,495 A | 2/1999 | Elliott et al. |
| 5,867,653 A * | 2/1999 | Aras et al. ..................... 709/204 |
| 5,903,302 A | 5/1999 | Browning et al. |
| 5,909,431 A | 6/1999 | Kuthyar et al. |
| 5,999,525 A | 12/1999 | Krishnaswamy et al. |
| 5,999,966 A | 12/1999 | McDougall |

(Continued)

FOREIGN PATENT DOCUMENTS

GB          2 369 746 A      6/2002

OTHER PUBLICATIONS

Cisco Systems, Inc. "Networkers: Deploying Voice over IP in Campus Environments." Session 404. Cisco Systems, Inc. 1998, 1-42.

(Continued)

*Primary Examiner* — Phirin Sam
(74) *Attorney, Agent, or Firm* — Fogarty, L.L.C.

(57) ABSTRACT

A system, method, and device for use in videoconferencing. The method typically includes installing a videoconferencing services switch at an access point to an IP network, and registering a plurality of subscribers for videoconferencing services. Each subscriber typically has a plurality of endpoints. The method further includes receiving subscriber-specific settings to be applied to multiple videoconferencing calls from the plurality of endpoints associated with each subscriber. The method further includes storing the subscriber-specific settings at a location accessible to the switch, and configuring the switch to connect calls from the plurality of endpoints at each subscriber based on the corresponding subscriber-specific settings.

20 Claims, 10 Drawing Sheets

(56) References Cited

U.S. PATENT DOCUMENTS

| | | | |
|---|---|---|---|
| 6,025,870 A | 2/2000 | Hardy | |
| 6,078,810 A | 6/2000 | Olds et al. | |
| 6,097,719 A | 8/2000 | Benash et al. | |
| 6,147,988 A | 11/2000 | Bartholomew et al. | |
| 6,157,401 A | 12/2000 | Wiryaman | |
| 6,167,445 A * | 12/2000 | Gai et al. | 709/223 |
| 6,188,687 B1 | 2/2001 | Mussman et al. | |
| 6,205,135 B1 | 3/2001 | Chinni et al. | |
| 6,205,488 B1 | 3/2001 | Casey et al. | |
| 6,262,978 B1 | 7/2001 | Bruno et al. | |
| 6,324,279 B1 * | 11/2001 | Kalmanek et al. | 379/229 |
| 6,363,053 B1 * | 3/2002 | Schuster et al. | 370/230 |
| 6,373,850 B1 | 4/2002 | Lecourtier et al. | |
| 6,374,302 B1 | 4/2002 | Galasso et al. | |
| 6,442,141 B1 * | 8/2002 | Borella et al. | 370/248 |
| 6,473,421 B1 * | 10/2002 | Tappan | 370/351 |
| 6,529,499 B1 * | 3/2003 | Doshi et al. | 370/352 |
| 6,529,513 B1 * | 3/2003 | Howard et al. | 370/401 |
| 6,563,793 B1 * | 5/2003 | Golden et al. | 370/236 |
| 6,594,704 B1 | 7/2003 | Birenback et al. | |
| 6,597,699 B1 | 7/2003 | Ayres | |
| 6,614,781 B1 * | 9/2003 | Elliott et al. | 370/352 |
| 6,625,258 B1 * | 9/2003 | Ram et al. | 379/88.13 |
| 6,640,239 B1 * | 10/2003 | Gidwani | 709/203 |
| 6,671,262 B1 * | 12/2003 | Kung et al. | 370/260 |
| 6,674,756 B1 | 1/2004 | Rao et al. | |
| 6,680,943 B1 * | 1/2004 | Gibson et al. | 370/392 |
| 6,714,987 B1 * | 3/2004 | Amin et al. | 709/249 |
| 6,744,741 B1 | 6/2004 | Ju et al. | |
| 6,757,732 B1 * | 6/2004 | Sollee et al. | 709/227 |
| 6,757,823 B1 | 6/2004 | Rao et al. | |
| 6,785,244 B2 | 8/2004 | Roy | |
| 6,885,658 B1 * | 4/2005 | Ress et al. | 370/352 |
| 6,909,708 B1 * | 6/2005 | Krishnaswamy et al. | 370/352 |
| 7,079,495 B1 | 7/2006 | Pearce et al. | |
| 7,085,243 B2 | 8/2006 | Decker et al. | |
| 7,088,706 B2 * | 8/2006 | Zhang et al. | 370/352 |
| 7,116,679 B1 * | 10/2006 | Ghahremani | 370/463 |
| 7,260,060 B1 * | 8/2007 | Abaye et al. | 370/230 |
| 7,734,908 B1 | 6/2010 | Kung et al. | |
| 7,822,188 B1 * | 10/2010 | Kirchhoff et al. | 379/211.02 |
| 2002/0187777 A1 * | 12/2002 | Osterhout et al. | 455/417 |
| 2002/0199203 A1 | 12/2002 | Duffy et al. | |
| 2003/0058836 A1 * | 3/2003 | Even | 370/352 |
| 2004/0022237 A1 * | 2/2004 | Elliott et al. | 370/356 |
| 2005/0002514 A1 * | 1/2005 | Shafiee et al. | 379/265.09 |

OTHER PUBLICATIONS

Kotha, Sam. "Deploying H.323 Applications in Cisco Networks." White paper, Cisco Systems, Inc. 1998, 1-14.
Check Point Software Technologies, Ltd., "Check Point FireWall-I™," White Paper, Jun. 1997, 34 pages, Version 3.0, P/N 400-3000, CTP00000800-33.
Check Point Software Technologies, Ltd™, "FireWall-I™ Version 4.0, Microsoft NetMeeting™ with Network Address Translation," Quick Reference, (no date), 5 pages, CTP00000836-40.
Chouinard, Dave, et al, "H.323 and Firewalls: The problems and pitfalls of getting H.323 safely through firewalls," Intel Corporation, Mar. 21, 2001, 43 pages, Revision 2.0, CTP00000841-83.
Cisco Systems, Inc., "Cisco H.323 Gateway Security and Accounting Enhancements," documentation, 1999, 20 pages, CPT00000899-918.
Cisco Systems, Inc., "Cisco IP/VC Quick Product Overview," brochure, 1999, 2 pages, CTP00000919-20.
Cisco Systems, Inc., "Cisco Multimedia Conference Manager: Provides H.323 Gatekeeper and Proxy Services for Reliable and Scalable Videoconferencing and Voice-over-IP Deployments," Data Sheet, 1999, 5 pages, CTP00000926-30.
Cisco Systems, Inc., "Cisco Secure PIX Firewall Series," Data Sheet, 1999, 8 pages, CTP00000931-38.
Cisco Systems, Inc., "Cisco Simplifies H.323 Multimedia Conferencing for Enterprises and Service Providers," article, Apr. 28, 1998, 2 pages, CTP00000939-40.
Cisco Systems, Inc., "H.323 Architecture and Design," presentation, 2000, 27 pages, CTP00000941-67.
Cisco Systems, Inc., "Intel and Cisco Complete Interoperability Test to Deliver H.323 Connectivity," press release, Oct. 6, 1998, 6 pages, CTP00000968-73.
Cisco Sysetms, Inc., "Intel Helps Businesses Make Internet Phone Calls Through Corporate Firewalls," article, Mar. 6, 1997, 3 pages, CTP00000974-76.
Cisco Systems, Inc., "Intranet and Extranet Virtual Private Networking," Technical Service Description, 1999, 39 pages, CTP00000977-1015.
Cisco Systems, Inc., "MPLS Virtual Private Networks," feature guide document, Cisco IOS Release 12.0(5)T, Dec. 1999, 50 pages, CTP00001016-65.
Cisco Systems, Inc., "Multimedia Conference Manager," data sheet, Jul. 1, 2001, 4 pages, CTP00001066-69.
Cosine Communications, "IP and Frame Relay: Bridging the Gap for Seamless and Secure Virtual Private Networking," White Paper, 1998-2000, 11 pages, CTP00001184-94.
Cosine Communications, "Moving Into the Cloud: The Case for Network-based VPNs," White Paper, 1998-2000, 11 pages, CTP00001195-205.
Djahandari, Kelly, et al., "An MBone Proxy for an Application Gateway Firewall," article, IEEE Symposium on Security and Privacy, 1997, 10 pages, CTP00001238-47.
Fossaceca, John M., et al., "The PathStar™ Access Server: Facilitating Carrier-Scale Packet Telephony," Bell Labs Technical Journal, Oct.-Dec. 1998, pp. 86-102, CTP00001266-82.
FVC.COM, "Access NGI: WAN Access Switch," brochure, 1999, 4 pages, CTP00001283-86.
Handley, Mark, "SIP: Session Initiation Protocol," Network Working Group, Request for Comments: 2543, The Internet Society, Internet Engineering Task Force, Mar. 1999, 168 pages, CTP00001297-464.
Hastings, Teresa, "IP Communications Services Trial," presentation, Voice on the Net, Fall '99, Sep. 29, 1999, 14 pages, CTP00001465-78.
Janes, Urmet, "H.323 Networks and Firewalls," Masters Thesis, Tallinn Technical University, 2000, 50 pages, CTP00001649-98.
Kotha, Sam, "Deploying H.323 Applications in Cisco Networks," White Paper, 1998, 14 pages, CTP00001707-20.
NEC USA, Inc., "Firewall Vulnerability and Network Protection for Streaming and Emerging UPD Applications," paper, Aug. 2000, 14 pages, CTP00001743-56.
Rizzetto, Daniele, et al., "A Voice Over IP Service Architecture for Integrated Communications," article, IEEE Internet Computing, May-Jun. 1999, pp. 53-62, CTP00001768-77.
Rosen, Eric C., et al., "BGP/MPLS VPNs," Network Working Group, Request for Comments: 2547, The Internet Society, Internet Engineering Task Force, Mar. 1999, 24 pages, CTP00001778-801.
Shore, Melinda, "H.323 and Firewalls: Problem Statement and Solution Framework," Internet Draft, Internet Engineering Task Force, Feb. 3, 2000, 10 pages, CTF00001802-11.
Copper Mountain Networks, Inc., "IP Service Intelligence At the Edge: Enabling Value-Added Services over DSL," paper, Lit Order Number: 80090-01, Apr. 2000, 18 pages, CTP00001836-53.
Toga, James, et al., "Demystifying Multimedia Conferencing Over the Internet Using the H.323 Set of Standards," article, Intel Technology Journal, Q2'98, 11 pages, CTP00001882-92.
Cisco Systems, Inc, "Cisco IP/VC 3500 Series—Videoconferencing Products," Cisco Product Catalog, May 2000, 4 pages, CTP00000887-90.
Check Point Software Technologies Ltd., "Check Point Software First to Enable Secure Streaming Media With Integrated QoS and Policy Enforcement," press release, Feb. 1, 2000, 2 pages, CTP00000834-35.
Michael Agnes, Editor in Chief, Webster's New World College Dictionary, Fourth Edition, CTP00020392-CTP00020395, 1999, (4 pages), Publisher: Macmillan USA, Published in: USA.
Microsoft Press, Microsoft Computer Dictionary, Fourth Edition, CTP00020396-CTP00020401, 1999, (6 pages), Publisher: Microsoft Press, Published in: Redmond, Washington.

(56) References Cited

OTHER PUBLICATIONS

Knight, S. et al., Virtual Router Redundancy Protocol, CTP00020402-CTP00020427, Request for Comments: 2338, Apr. 1998, (26 pages), Publisher: The Internet Society: Network Working Group.
Li, T. et al., Cisco Hot Standby Router Protocol (HSRP), CTP00020428-CTP00020443, Request for Comments: 2281, Mar. 1998, (16 pages),Publisher: The Internet Society: Network Working Group.
Unknown, Accord Set Up (3 pages), Apr. 18, 2001.
Ridgeway Systems & Software, Ridgeway VX-System Cover Letter: Version 3.2 Cover Letter Issue 1, 1999-2001, (8 pages).
Accord Networks, Accord Conferencing Solution a Winner with Geoconference Customers, CTP00020219-CTP00020221, Oct. 26, 1999, (3 pages).
Data Connection, Data Connection Unveils Comprehensive Voice-over-IP Roadmap, Press Release, CTP00020222-CTP00020224, Dec. 14, 1999, (3 pages), Published in: London, UK.
Willebeek-Lemair et al., Distributed Video Conferencing Systems, CTP00020225-CTP00020236, Computer Communications, 1997, pp. 157-168, vol. 20, Publisher: Elsevier Science B.V., Published in: Yorktown Heights, NY, USA.
Rosenberg, J. et al., Getting SIP through Firewalls and NATs, CTP00020237-CTP00020262, Internet Draft, Feb. 22, 2000, (26 pages), Publisher: dynamicsoft, Level 3, Columbia U., Internet Engineering Task Force.
Accord Networks, MOREnet Taps Accord for its Multipoint Conferencing and Gateway Services, CTP00020263-CTP00020264, 2000, (2 pages).
Unknown, Virtual PrivateIP Video Network Saves Large Corporate Users Money, CTP00020265-CTP00020267, (Date Unknown), (3 pages), Publisher: http://www.radvision.com.
Microsoft Press, Microsoft Computer Dictionary, Fourth Edition, CTP00020444-CTP00020447, 1999, (4 pages), Publisher: Microsoft Press, A Division of Microsoft Corporation, Published in: Redmond, WA.
IEEE, IEEE 100: The Authoritative Dictionary of IEEE Standards Terms, Seventh ed., CTP00020448-CTP00020450, 2000, (3 pages), Publisher: Standards Information Network: IEEE Press.
Ridgeway Systems & Software, Deploying IP-Based Conferencing Services, White Paper, 2001, (8 pages).
Ridgeway Systems & Software, Firewall and NAT Traversal Methods (An analysis for Voice and Video over IP), White Paper, 2001, (16 pages).
Ridgeway Systems & Software, Firewalls and H.323: How Ridgeway can help you overcome the issues Brochure, 2001, (2 pages).
Teleconference Systems, LLC, Plaintiffs Preliminary Infringement Contentions, Teleconference Systems, *LLC* v. *AT&T Corp., et al.* Case No. 6:10-cv-239, (Date Unknown), Page(s) (150 pages).
Teleconference Systems, LLC., Defendant's Infringement Contentions, *Teleconference Sys.* v. *Proctor & Gamble Pharm. et al.* Case No. 3:09-cv-01550-JSW, (Date Unknown), Page(s) (175 pages).
Unknown, MCU Dial-Out Tutorial—Draft Copy, (Date Unknown), (11 pages).
Ridgeway Systems & Software, Address Translation: How Ridgeway can help you overcome the issues, Brochure, 2001, (2 pages).
Ridgeway Systems & Software, netHance Server Management, Version 3.1, 1999-2001, (85 pages).
Ridgeway Systems & Software, click-connect-communicate, Brochure, 2001, (2 pages).
Ridgeway Systems & Software, IP Voice and Video Without Sacrificing Security, (Date Unknown), (1 page).
Ridgeway Systems & Software, The Ridgeway VX Multimedia Application Platform Architecture, Connectivity, Security and Capabilities Brief, (Date Unknown), (3 pages).
Grochocinski, Timothy E., Objections and Second Supplemental Answer to Interrogatory No. 1, *CISCO Systems, Inc.* v. *Teleconference Systems, LLC et al.*, Mar. 8, 2011, (5 pages).
Gettings, Christopher, Letter Responding to Subpoenas, Sep. 28, 2010, (16 pages).
Ridgeway Systems & Software, Ridgeway VX-System Programming Guide, Version 3.1, 2001, (28 pages).
Ridgeway Systems & Software, Ridgeway VX-Element Hardware Installation, Version 3.1, 1999-2001, (37 pages).
Ridgeway Systems & Software, Ridgeway VX-Element Management, Version 3.1, 1999-2001, (37 pages).
Ridgeway Systems & Software, Ridgeway VX-System Resources Installation, Version 3.1, 1999-2001, (23 pages).
Ridgeway Systems & Software, Ridgeway VX-System Software Upgrade and Reinstallation, Version 3.1, 1999-2001, (39 pages).
Ridgeway Systems & Software, Ridgeway VX-System Deployment, Version 3.1, 1999-2001, (38 pages).
Ridgeway Systems & Software, Ridgeway VX-System Getting Started, Version 3.1, 1999-2001, (50 pages).
Ridgeway Systems & Software, Ridgeway VX-System Management, Version 3.1, 1999-2001, (84 pages).
Ridgeway Systems & Software, Ridgeway VX-System Release Notes, Version 3.1, 1999-2001, (13 pages).
Ridgeway Systems & Software, Fact Sheet: *VX-Centrex* vs. *CPE*, Oct. 19, 1999, (1 page).
Ridgeway Systems & Software, Ridgeway VX Media Manager: Server software for the Ridgeway VX Communication System, Brochure, 2001, (2 pages).
Ridgeway Systems & Software, Ridgeway VX Server Family: Hardware for the Ridgeway VX Communication System, Brochure, 2001, (3 pages).
Wire One Technologies, "Security and Privacy on the Glowpoint Network," Letter, (no date), 2 pages, GLOW-00000002-3.
Pundt, Richard A., "Response by enlighten technologies, inc. To Subpoena to Produce Documents, Information, or Objects or to Permit Inspection of Premises in a Civil Action," submitted in connection with *Cisco Systems, Inc.* v *Teleconference Systems, LLC, et al.* pending in the United States District Court for the Northern District of California, Civil Action No. 3:09-cv-01550-JSW, 15 pages, Oct. 1, 2010.
Cisco Systems, Inc., et al., "Joint Invalidity Contentions," submitted in connection with *Cisco Systems, Inc.* v *Teleconference Systems, LLC, et al.* pending in the United States District Court for the Northern District of California, Civil Action No. 3:09-cv-01550-JSW; and *Teleconference Systems, LLC* v *Tandberg, Inc. et al.*, pending in the United States District Court for the Northern District of California, Civil Action No. 3:10-cv-01325-JSW, 113 pages, Nov. 19, 2010.
Cisco Systems, Inc., et al., "Joint Invalidity Contentions—Attachment A" submitted in connection with *Cisco Systems, Inc.* v *Teleconference Systems, LLC, et al.* pending in the United States District Court for the Northern District of California, Civil Action No. 3:09-cv-01550-JSW; and *Teleconference Systems, LLC* v *Tandberg, Inc. et al.*, pending in the United States District Court for the Northern District of California, Civil Action No. 3:10-cv-01325-JSW, 113 pages, Nov. 19, 2010.
Cisco Systems, Inc., et al., "Joint Invalidity Contentions—Attachment A-2" submitted in connection with *Cisco Systems, Inc.* v *Teleconference Systems, LLC, et al.* pending in the United States District Court for the Northern District of California, Civil Action No. 3:09-cv-01550-JSW; and *Teleconference Systems, LLC* v *Tandberg, Inc. et al.*, pending in the United States District Court for the Northern District of California, Civil Action No. 3:10-cv-01325-JSW, 113 pages, Nov. 19, 2010.
"Multimedia Conference Manager," Release 11.3 NA, (no date), 42 pages, CTP00001070-111.
fvc.com, "Click to Meet™ Jump Start Program," brochure, (no date), 4 pages, CTP00001291-94.
Ridgeway Systems & Software, "Ridgeway Announces New Hardware Platform to Facilitate Voice Over IP," article, May 18, 1999, 3 pages, CTP00006708-710.
Roe, S., "Web Conferencing: Security," presentation, Fall Forum—Keystone, Colorado, Nov. 1999, 30 pages, CTP00008323-52.
Ridgeway Systems & Software Ltd, "Ridgeway VX-Centrex™: Broadband Multimedia Communications," 1999-2000, 2 pages, CTP00018207-8.
Joint Claim Construction and Prehearing Statement; filed in the United States District Court for the Northern District of California, San Francisco Division; case Nos. C 09-01550 JSW (*Cisco* v *Tele-*

(56) References Cited

OTHER PUBLICATIONS

*conference Systems, et al*), C 10-1325 JSW (*Teleconference Systems v Tandberg*), and C 10-5740 JSW (Document 101) (*Teleconference Systems v AT&T*(; Apr. 1, 2011, (7 pages).
Joint Claim Construction Statement—Exhibit A—U.S. Patent No. 6,980,526: Disputed Constructions; Case Nos. C 09-01550 JSW, C 10-1325 JSW, C 10-5740 JSW (Document 101-1); Apr. 1, 2011; (13 pages).
Grochocinski, Timothy E., Teleconference Systems, LLC and Margalla Communications, Inc.'s Opening Claim Construction Brief, (USDC for the ND of California; Case No. 3:10-cv-01325, Document No. 102; Case No. 3:10-cv-05740, Document No. 110; Case No. 3:09-cv-01550, Document No. 245), Apr. 29, 2011 (21 pages).
Klausner, David, Opening Expert Report of David Klausner Regarding Indefiniteness, USDC for the ND of California; Case No. 3:10-cv-01325, Document No. 102-2; Case No. 3:10-cv-05740, Document No. 110-2; Case No. 3:09-cv-01550, Document No. 245-2), Apr. 1, 2011 (50 pages).
Klausner, David, Rebuttal Expert Report of David Klausner in Response to the Declaration of Kevin Jeffay, Ph.D (USDC for the ND of California; Case No. 3:10-cv-01325, Document No. 102-3; Case No. 3:10-cv-05740, Document No. 110-3; Case No. 3:09-cv-01550, Document No. 245-3), Apr. 29, 2011 (16 pages).
Mehta, Sonal N., Coordinated Joint Invalidity Contentions; (USDC for the ND of California; Case No. 3:10-cv-01325; Case No. 3:10-cv-05740; Case No. 3:09-cv-01550), Feb. 11, 2011 (334 pages).
Unknown; Attachment A; Invalidity of U.S. Pat. No. 6,980,526 by Cisco IP/VC 3500 Series-Videoconferencing Products, pp. 1-4 (May 2000)(IP/VC 3500 Series); (date unknown); (372 pages).
Grochocinski, Timothy; Defendants' Supplemental Responses to Cisco Systems, Inc.'s and Third Party Defendants' First Set of Interrogatories; filed in *Cisco Systems Inc. v. Teleconference Systems, LLC et al.*; in the United States District Court for the Northern District of California; Apr. 15, 2011 (7pages).
Ould-Brahim, Hamid et al., Network based IP VPN Architecture using Virtual Routers, (TS-CA020118-132); Jul. 2000, (15 pages); Publisher: Network Working Group.
Ould-Brahim, H. et al., Network based IP VPN Architecture Using Virtual Routers, (TS-CA0200133-146); Mar. 2000, (14 pages); Publisher: Network Working Group.
Ould-Brahim, Hamid et al., Network based IP VPN Architecture using Virtual Routers (TS-CA0200166-183); Mar. 2001, (18 pages); Publisher: Provider Provisioned VPN WG.
Ould-Brahim, Hamid et al., Network based IP VPN Architecture using Virtual Routers (TS-CA020147-165); Nov. 2000, (19 pages); Publisher: Network Working Group.
Stelzer, Elwin et al., Virtual Router Management Information Base Using SMIv2 (TS-CA020184-211); Jul. 2001; (28 pages).
Stelzer, Elwin et al., Virtual Router Management Information Base Using SMIv2 (TS-CA020212-235); Nov. 2001; (24 pages).
Davies, S. et al., Traversal of non-Protocol Aware Firewalls & NATS (CTP00001206), Internet Draft, Sep. 2001, (32 pages), Publisher: Internet Engineering Task Force.
Ridgeway Systems & Software, Next Generation IP Conferencing Services (CTP00001757), White Paper, 1999, (11 pages).
Ridgeway Systems & Software, Deploying IP-Based Conferencing Services (CTP00006368), 2001, (8 pages).
Ridgeway Systems & Software, Firewalls & H.323 (CTP0006399), (date unknown), (1 page).
Ridgeway Systems & Software, Net Enhanced Telephony (CTP00006675), 1999, (13 pages).
Ridgeway Systems & Software, Product Description & Price List, Version 1.1 (CTP00006695), Jan. 2000, (13 pages).
Ridgeway Systems & Software, Ridgeway Announces New Hardware Platform to Facilitate Video Over IP (CTP00006708), Press Release, May 18,1999, (3 pages).
Ridgeway Systems & Software, Ridgeway System & Software Gatekeeper Interoperability & Functionality Overview (CTP00007824), (date unknown), (2 pages).
Ridgeway Systems & Software, Video: A Vertical Application of the VoIP Network (CTP00007995), (date unknown), (28 pages), Publisher: TeleCon '99.
Ridgeway Systems & Software, The IP Obstacle Course (CTP00008023), Apr. 2001, (18 pages).
Ridgeway Systems & Software, H.32 Centrex Services (CTP00008042), White Paper, (date unknown), (9 pages).
Ridgeway Systems & Software, Product Vision (CTP00008051), White Papers, 1999, (2 pages).
Ridgeway Systems & Software, Fact Sheet: VX-Centrex vs. CPE (CTP00008281), Oct. 19, 1999, (1 page).
Ridgeway Systems & Software, VX-Centrex: An Overview (CTP00008282), (date unknown), (41 pages).
IMTC, Web Conferencing: Security (CTP00008323), Nov. 1999, (30 pages), Publisher: Fall Forum, Keystone, Colorado.
Unknown, V3.1 Development Status, Version 1 (CTP00008410), Nov. 28, 2000, (3 pages).
Ridgeway Systems & Software, netHance Server Management, Version 2.2 (CTP00008828), 2000, (71 pages).
Ridgeway Systems & Software, netHance Server Release Notes, Version 2.2 (CTP00008899), 2000, (9 pages).
Ridgeway Systems & Software, netHance Web Viewer Installation, Version 2.2 (CTP00008908), 2000, (6 pages).
Ridgeway Systems & Software, Ridgeway VX-Centrex Network Deployment, Version 2.2 (CTP00008963), 2000, (26 pages).
Ridgeway Systems & Software, Ridgeway VX-Centrex Management, Version 2.2 (CTP00008995), 20000, (89 pages).
Ridgeway Systems & Software, Our Mission (CTP00018201), (date unknown), (2 pages), Publisher: Brochure.
Ridgeway Systems & Software, Ridgeway VX Centrex (CTP00018203), 1999-2000, (58 pages).
Ridgeway Systems & Software, netHance Server Management (CTP00018388), 2000, (51 pages).
Ridgeway Systems & Software, Ridgeway VX-Centrex Network Deployment (CTP00018500), 2000, (28 pages).
Ridgeway Systems & Software, Ridgeway VX-Centrex Management (CTP00018534), 2000, (89 pages).
Ridgeway Systems & Software, Ridgeway VX-System Management (CTP00018641), 2000, (89 pages).
Ridgeway Systems & Software, Deploying IP-Based Conferencing Services (West000004), 2001, (8 pages).
Ridgeway Systems & Software, Firewalls and H.323 How Ridgeway can help you overcome the issues (West000012), 2001, (2 pages).
Ridgeway Systems & Software, Firewall and Nat Traversal Methods, (West000014), 2001, (16 pages).
Ridgeway Systems & Software, Address Translation How Ridgeway can help you overcome the issues (West000041), 2001, (2 pages).
Ridgeway Systems & Software, IP Voice and Video without Sacrificing Security (West000045), (date unknown), (1 page).
Ridgeway Systems & Software, The Ridgeway VX Multimedia Application Platform Architecture, Connectivity, Security and Capabilities Brief (West000046, (date unknown), (3 pages).
Ridgeway Systems & Software, Fact Sheet: *VX-Centrex* vs. *CPE* (West000077), 1999, (1 page.)
Ridgeway Systems & Software, Ridgeway VX Media Manager (West000078), 2001, (2 pages).
Ridgeway Systems & Software, Ridgeway VX Server family (West000080), 2001, (3 pages).
Ridgeway Systems & Software, Ridgeway VX-Element Management (West000216), 1999-2001, (37 pages).
Ridgeway Systems & Software, Ridgeway VX-System Deployment (West000315), 1999-2001, (38 pages).
Ridgeway Systems & Software, Ridgeway VX-System Management (West000403), 2001, (84 pages).
Tandberg, Inc. et al, "Defendants' Responses to Plaintiff's Second Set of Common Interrogatories," USDC for NDCA, Case No. C 10-1325-JSW, Nov. 7, 2011, (10 pages).
Cisco Systems, Inc., "Cisco Systems, Inc.'s Objections and Responses to Defendants' Third Set of Common Interrogatories," USDC for NDCA, Case No. C 10-1325-JSW, Nov. 7, 2011, (10 pages).

(56) References Cited

OTHER PUBLICATIONS

Tandberg, Inc. et al, "Defendants' Responses to Plaintiff's Third Set of Common Interrogatories," USDC for NDCA, Case No. C 10-1325-JSW, Nov. 7, 2011, (10 pages).

AT&T Corp. et al., "Defendants' Objections and Responses to Defendants' Third Set of Common Interrogatories," USDC for NDCA, Case No. C 10-1325-JSW, Nov. 7, 2011, (10 pages).

Unknown, "Technology Tutorial, U.S. Patent No. 6,980,526," USDC for NDCA, Case Nos. 3:10-cv-01325-JSW, 3:10-cv-05740-JSW, C:09-cv-01550, Nov. 8, 2011, (35 pages).

Cisco, et al., "Cisco and Customer Defendants' Claim Construction Tutorial Presentation," USDC for NDCA, Case Nos. 3:10-CV-01325-JSW, 3:10-cv-05740-JSW, C:09-cv-01550, Nov. 8, 2011, (23 pages).

Teleconference Systems, LLC et al., "Defendants' Fifth Supplemental Response to Cisco Systems, Inc.'s and Third Party Defendants' First Set of Interrogatories," USDC for NDCA, Case No. C 10-1550-JSW, Nov. 3, 2011, (17 pages).

Margalla Communications, Inc., "Defendant Margalla Communications, Inc.'s Responses to Cisco Systems, Inc.'s and Third Party Defendants' Second Set of Interrogatories," USDC for the Northern District of California, Case No. C 09-015510 JSW, Mar. 13, 2012, 15 pages.

Teleconference Systems, LLC, "Teleconference Systems, LLC Infringement Contentions," *Cisco Systems, Inc.* v. *Teleconference Systems, LLC, et al.* v. *The Proctor & Gamble Pharmaceuticals, Inc., et al*, Case No. C 09-01550 JSW, Case 3:10-cv-05740-JSW, Document 152-5, Mar. 14, 2012, 163 pages.

Teleconference Systems, LLC, "Teleconference Systems, LLC Infringement Contentions," *Cisco Systems, Inc.* v. *Teleconference Systems, LLC, et al.* v. *The Proctor & Gamble Pharmaceuticals, Inc., et al*, Case No. C 09-01550 JSW, Case 3:09-cv-01550-JSW, Document 302-5, Mar. 20, 2012, 163 pages.

Teleconference Systems, LLC, "Plaintiff's Preliminary Infringement Contentions," *Teleconference Systems, LLC* v. *Tandberg, Inc., et al.*, Case No. 3:10-cv-01325-JSW, Case 3:10-cv-05740-JSW, Document 152-6, Mar. 14, 2012, 139 pages.

Teleconference Systems, LLC, "Teleconference Systems, LLC's Supplemental Infringement Contentions," *Cisco Systems, Inc.* v. *Teleconference Systems, LLC et al*, Case No. C 09-01550 JSW, *Teleconference Systems, LLC,* v *AT&T Corp.*, et al, Case No. C 10-05740 JSW, Case 3:10-cv-05740-JSW, Document 152-1, Mar. 14, 2012, 22 pages.

Teleconference Systems, LLC, "Teleconference Systems, LLC's Supplemental Infringement Contentions," Teleconference Systems, *LLC* v *Tandberg, Inc, et al.*, Case No. C 10-01325 JSW, Case 3:10-cv-05740-JSW, Document 152-2, Mar. 14, 2012, 7 pages.

Teleconference Systems, LLC, "Defendant Teleconference Systems, LLC's Responses to Cisco Systems, Inc.'s and Third Party Defendants' Second Set of Interrogatories," USDC for the Northern District of California, Case No. C 09-015510 JSW, Mar. 13, 2012, 16 pages.

fvc.com, "V-Gate 4000 User's Guide," Mar. 1998, (158 pages), Rev. A, (ATT-TS00000001-158).

fvc.com, "New FVC.Com Gateway Enables Widespread Adoption of IP Videoconferencing—V-Gate 4000 videoconferencing system—Product Announcement," Cambridge Telcom Report, Jul. 12, 1999, (1 page), (ATT-TS00000159).

Meserve, Jason, "Videoconferencing takes to the Web," Network World Fusion, Nov. 29, 1999, (4 pages), (ATT-TS00000186-189).

fvc.com, "fvc.com Announces Availability of Click to Meet(TM) Two Way Video Services for the Broadband Internet," Press Release, Feb. 29, 2000, (2 pages), (ATT-TS00000190-191).

fvc.com, "Differentiate Your Bandwidth," (waybackmachine capture of http://www.fvc.com/products/video_portal.html between Nov. 27, 1999-Feb. 15, 2001), (2 pages), (ATT-TS00000192-193).

fvc.com, "Video Portal," (waybackmachine of http://www.fvc.com/clicktomeet.htm between Jun. 15, 2000-Jun. 18, 2001), (1 page), (ATT-TS00000194).

Cisco, "Integrating SIP Trunks in Enterprise Networks for Next-Generation Unified Communications," White Paper, 1992-2007, (7 pages), (CTP10003654-660).

Tandberg, "Gatekeeper N4 Software Release Document," D50404, Rev 1.2 (date unknown), (20 pages), (CTP10034798-817).

Tandberg, "See Hello to the New Way of Working," brochure, (date unknown), (20 pages), (CTP10035125-144).

Tandberg, "ISDN overflow using CPL script," Application Note VCS X2.0, (date unknown), (5 pages), (CTP10035766-770).

Tandberg, "Implementing Secure Management," D50520 03, (date unknown), (94 pages), (CTP10036201-294).

Tandberg, "Tandberg Border Controller User Manual," Software version Q3.0, D13691.03, 1993-2006, (84 pages), (CTP10037910-993).

Tandberg, "Tandberg Gatekeeper User Manual," Software version N4.0, D13381.04, 1993-2006, (84 pages), (CTP10037994-8075).

Frost & Sullivan, "Maximizing the Value of Telepresence Interoperability is Key to Success," White Paper, (date unknown), (13 pages), (CTP10038249-261).

Tandberg, "Session Initiation Protocol (SIP): An emerging standard," (date unknown), (1 page), (CTP10038330).

Tandberg, "Telepresence Buyer's Guide; A Checklist to Ensure Your ROI," (date unknown), (3 pages), (CTP10038331-333).

Tandberg, "A Guide to Videoconferencing Infrastructure," (date unknown), (8 pages), (CTP10035877-884).

Teleconference Systems, LLC, et al., "Defendants' Fourth Supplemental Response to Cisco Systems, Inc.'s and Third Party Defendants' First Set of Interrogatories," USDC for the NDCA, Case No. 09-01550-JSW, Sep. 19, 2011, (10 pages).

Teleconference Systems, LLC, Letter to Magistrate Judge Nathanael Cousins, USDC for the NDCA, Case No. 09-01550-JSW, Oct. 11, 2011, (6 pages).

Teleconference Systems, LLC, et al., "Teleconference Systems, LLC and Margalla Communications, Inc.'s Amended Opening Claim Construction Brief," USDC for the NDCA, Case No. 09-01550-JSW, Sep. 12, 2011, (32 pages).

Klausner, David, "Rebuttal Expert Report of David Klausner in Response to the Declaration of Kevin Jeffay, Ph.D Regarding Claim Construction of U.S. Patent No. 6,980,526," USDC for the NDCA, Case No. 09-01550-JSW, et al., Sep. 12, 2011, (16 pages).

Klausner, David, "Deposition of David Klausner," Exhibit 3, USDC for the NDCA, Case No. 09-01550-JSW, et al., Jun. 17, 2011, (39 pages).

Klausner, David, "Videotaped Deposition of David Klausner," USDC for the NDCA, Case No. 09-01550-JSW, et al., May 10, 2011, (3 pages).

Klausner, David, "Opening Expert Report of David Klausner regarding Indefiniteness," USDC for the NDCA, Case No. 09-01550-JSW, et al., Sep. 9, 2011, (50 pages).

Ghane, Kamram, "Internetworking with ATM-based Switched Virtual Networks," (downloaded from http://www.isoc.org/inet95/proceedings/PAPER/142/html/paper.html on Jun. 15, 2011), May 8, 1995, (11 pages), (TS-CA020361-370).

Muthukrishnan, Karthik et al. "A Core MPLS IP VPN Architecture," The Internet Society, RFC 2917, Sep. 2000, (18 pages), (TS-CA020381-397).

Sturtevant, Reed, "Using RAS for Routing of IP Packets," (downloaded from http://sturtevant.com/technote/kbroute.htm on Jun. 15, 2011) Article ID: Q121877 on www.microsoft.com, Nov. 5, 1995, (6 pages), (TS-CA020372-376).

Cisco Systems, LLC, et al., "Amended Joint Claim Construction Opposition Brief," USDC for the NDCA, Case No. 09-01550-JSW et al., Sep. 26, 2011, (35 pages).

Klausner, David, "Videotaped Deposition of David Klausner," USDC for the NDCA, Case No. 09-01550-JSW, et al., May 10, 2011, (43 pages).

International Telecommunication Union, "ITU-T Recommendation H.323, Series H: Audiovisual and Multimedia Systems," Feb. 1998, (129 pages), (CTP00003937-4064).

Handley, Mark, et al., "SIP: Session Initiation Protocol," The Internet Society, RFC 2543, Request for Comments, Mar. 1999, (169 pages), CTP00001297-464).

(56) References Cited

OTHER PUBLICATIONS

Jeffay, Kevin, et al., "Declaration of Kevin Jeffay, Ph.D., regarding Claim Construction of U.S. Patent No. 6,980,526," USDC for the NDCA, Case No. 09-01550-JSW, et al., Sep. 26, 2011, (23 pages).
Knight, Steven, et al., "Virtual Router Redundancy Protocol," The Internet Society, RFC 2338, Apr. 1998, (27 pages), (CTP00020402-427).
Klausner, David, "Deposition of David Klausner," Exhibit J, USDC for the NDCA, Case No. 09-01550-JSW, et al., Jun. 17, 2011, (11 pages).
Teleconference Systems, LLC, et al., "Teleconference Systems, LLC and Margalla Communications, Inc.'s Amended Reply Claim Construction Brief," USDC for the NDCA, Case No. 09-01550-JSW, Oct. 5, 2011, (19 pages).
Klausner, David, "Deposition of David Klausner," Exhibit 5, USDC for the NDCA, Case No. 09-01550-JSW, et al., Jun. 17, 2011, (29 pages).
Teleconference Systems, LLC, et al., "Teleconference Systems, LLC and Margalla Communications, Inc.'s Amended Opening Claim Construction Brief," USDC for the NDCA, Case No. 09-05740-JSW, Aug. 12, 2011, (31 pages).
Klausner, David, "Deposition of David Klausner," Exhibit 8, USDC for the NDCA, Case No. 09-05740JSW, et al., Jun. 17, 2011, (52 pages).
Cisco Systems, LLC, et al., "Amended Joint Claim Construction Opposition Brief," USDC for the NDCA, Case No. 09-05740-JSW et al., May 21, 2011, (35 pages).
Klausner, David, "Videotaped Deposition of David Klausner," USDC for the NDCA, Case No. 09-05740-JSW, et al., May 10, 2011, (34 pages).
IEEE, "IEEE 100—The Authoritative Dictionary of IEEE Standards Terms," 7th Edition, 2000, pp. 447.
Agnes, Michael, "Webster's New World College Dictionary," 4th Edition, 1999, pp. 407, 1427.
Teleconference Systems, LLC, et al., "Teleconference Systems, LLC and Margalla Communications, Inc.'s Reply Claim Construction Brief," USDC for the NDCA, Case No. 09-01325-JSW, Jun. 8, 2011, (17 pages).
Klausner, David, "Videotaped Deposition of David Klausner," Exhibit 3, USDC for the NDCA, Case No. 09-01325-JSW, et al., May 10, 2011, (6 pages).
Parties, "Second Amended Joint Claim Construction and Prehearing Statement, Cisco and Customers' Objection to Teleconference Systems and Margalla's Supplementation to Joint Claim Construction Statement and Teleconference and Margalla's Objections to Cisco and Customers' Objections," USDC for NDCA, Case No. 10-1325-JSW, Aug. 2, 2011, (8 pages).
Parties, "Exhibit A to Second Amended Joint Claim Construction and Prehearing Statement," USDC for NDCA, Case No. 10-1325-JSW, Aug. 2, 2011, (98 pages).
Parties, "Third Amended Joint Claim Construction and Prehearing Statement," USDC for NDCA, Case No. 10-1325-JSW, Aug. 2, 2011, (6 pages).
Parties, "Exhibit A to Second Amended Joint Claim Construction and Prehearing Statement," USDC for NDCA, Case No. 10-1325-JSW, Aug. 2, 2011, (92 pages).
Klausner, David, "Videotaped Deposition of David Klausner," Exhibit 1, USDC for the NDCA, Case No. 09-01325-JSW, et al., Jun. 17, 2011, (47 pages).
Parties, "Amended Joint Claim Construction and Prehearing Statement," USDC for NDCA, Case No. 10-1325-JSW, Jun. 8, 2011, (7 pages).
Parties, "Exhibit A to Amended Joint Claim Construction and Prehearing Statement," USDC for NDCA, Case No. 10-1325-JSW, Jun. 8, 2011, (88 pages).
AT&T Corp. et al., "Invalidity Contentions," USDC for NDCA, Case No. C 10-5740-JSW, Apr. 18, 2011, (8 pages).
White, Jeffrey S., "Order Denying Motion for Clarification or for Leave to File a Motion for Reconsideration," filed in *Cisco Systems,*

*Inc.* v *Teleconference Systems, LLC*, 3:09-cv-01550-JSW, USDC for the NDCA, Document 295, Dec. 20, 2011, (2 pages).
Reines, Edward et al., "Joint Stipulation Regarding Claim Construction of 'Configuring' Terms," filed in *Cisco* v *Teleconference Systems, Llc*, 3:09-cv-01550-JSW, USDC for the NDCA, Document 294, Dec. 16, 2011, (5 pages).
Grochocinski, Timothy et al., "Teleconferencing Systems, LLC and Margalla Communications, Inc.'s Motion for Clarification of the Court's Claim Construction Order Regarding the Term "Enterprise Video Gateway" or in the Alternative Motion for Leave to File Motion for Reconsideration," filed in *Cisco Systems, Inc.* v *Teleconference Systems, LLC*, 3:09-cv-01550-JSW, USDC for the NDCA, Document 293, Dec. 7, 2011, (5 pages).
White, Jeffrey S. "ClaimsConstructionOrder," filed in *Cisco Systems, Inc.* v *Teleconference Systems, LLC*3:09-cv-01550-JSW, USDC for the NDCA, Document 289, Nov. 28, 2011, (14 pages).
Simon, Anthony et al., "Defendants Sixth Supplemental Response to Cisco System, Inc.'s and Third Party Defendants' First Set of Interrogatories," 3:09-cv-01550-JSW, USDC for the NDCA, Nov. 30, 2011, (4 pages).
Teleconference Systems, LLC et al. "Joint Supplemental Case Management Status Report," *Cisco Systems, Inc.* v. *Teleconference Systems, LLC, et al.*, Case No. C 09-01550 JSW in the United States District Court for the Northern District of California, Document 316 in Case 3:10-cv-05740-JSW, May 4, 2012, (16 pages).
Coulibaly, Mack M., "Cisco IOS Releases: The Complete Reference," Mar. 22, 2000, Chapter 6, pp. 73-87, Cisco Press.
Cisco Systems, Inc., "Caveats for Cisco IOS Release 11.3 T," 1999-2004, (46 pages).
Cisco Systems, Inc., "Release Notes for Cisco CallManager Release 3.0(7)," Jan. 16, 2001, (62 pages).
Cisco Systems, Inc., "Release Notes for Cisco CallManager Release 3.0(8)," Feb. 22, 2001, (52 pages).
Cisco Systems, Inc., "Cisco IOS X-Release 12.1(3)XI," 2000, (9 pages).
Cisco Systems, Inc., "Open Packet Telephony Architecture Session 1506," 1998, (41 pages).
Cisco Systems, Inc., "Advanced Enterprise Campus/WAN IP Telephony Design and Implementation Session 2006," 2000, (50 pages).
Cisco Systems, Inc., "Cisco AVVID Product Update Session 2008," 2000, (33 pages).
Cisco Systems, Inc., "Video Over IP Product Update Session 2009," 2000, (29 pages).
Cisco Systems, Inc., "Introduction to IP Video Streaming and Conferencing Session 2010," 2000, (31 pages).
Cisco Systems, Inc., "IP Video Technologies—Deploying Video on Your Network Session 2011," 2000, (57 pages).
Cisco Systems, Inc., "Deploying Large Scale SP VoIP Networks Session 2014," 2000, (27 pages).
Cisco Systems, Inc., "Networking for E-Learning Session 3102," 2000, (23 pages).
Cisco Systems, Inc., "Release Notes for Cisco IOS Release 12.1(5)T," 2001, (62 pages).
Cisco Systems, Inc., "Designing a Static Dial Plan," Oct. 25, 2001, (56 pages).
Cisco Systems, Inc., "Cisco IP/VC 3520 and 3525 Videoconferencing Gateways," 2001, (5 pages).
Cisco Systems, Inc., "Multimedia Conference Manager with Voice Gateway Image with RSVP to ATM SVC Mapping," Nov. 2, 2000, (18 pages).
Cisco Systems, Inc., "Cisco IP/VC Videoconferencing Solution," 2001, (11 pages).
Cisco Systems, Inc., "H.323 Architecture and Design," 2000, (27 pages).
Cisco Systems, Inc., "Troubleshooting IP Videoconferencing," 1998, (31 pages).
Cisco Systems, Inc., "Cisco Multiservice IP to IP Gateway," 1992-2002, (11 pages).
Cisco Systems, Inc., "Cisco Multimedia Conference Manager," 1999, (5 pages).
Kirby, Scott, "Cisco Video Conferencing Gatekeeper Design," 2000, (28 pages).

(56) References Cited

OTHER PUBLICATIONS

Cisco Systems, Inc., "Cisco 2600 Series—Release Notes for Release 12.1(3)T1 Feature Packs," 2000, (21 pages).
Cisco Systems, Inc., "Release Notes for the Cisco 7750 for Cisco IOS Release 12.1(5)T2," 2001, (24 pages).
Cisco Systems, Inc., "Release Notes for Cisco VG200 for Cisco IOS Release 12.1(3)T," Sep. 5, 2000, (14 pages).
Cisco Systems, Inc., "Cisco Service Provider Business Voice Solution," 1992-2003, (12 pages).
Cisco Systems, Inc., "Troubleshooting IP Videoconferencing Session VVT-330," 1998, (31 pages).
Cisco Systems, Inc., "Introduction to IP Videoconferencing Technologies Session VVT-130," 2001, (29 pages).
Cisco Systems, Inc., "Deploying QoS for Voice and Video in IP Networks, Session VVT-213," 1998, (52 pages).
Cisco Systems, Inc., "Case Study: Cisco's IP Telephony Deployment, Session VVT-214," 1998 (40 pages).
USDC-NDCA, "Order Granting Joint Motion to Dismiss," *Cisco Systems, Inc. v. Teleconference Systems, LLC, et al.*, Case No. C 09-01550 JSW in the United States District Court for the Northern District of California, Jul. 3, 2012.
Chouinard, Dave, "Socks V5 UDP and Multicast Extensions to Facilitate Multicast Firewall Traversal" AFT Working Group Internet Draft, Nov. 20, 1997, (24 pages).
Rosen, Eric C., "Multiprotocol Label Switching Architecture," Network Working Group Internet Draft, Jul. 2000, (66 pages).
Jang, Saqib, "Videotaped Deposition of Saqib Jang," *Cisco Systems, Inc. v. Teleconference Systems, LLC, et al.*, Case No. C 09-01550 JSW in the United States District Court for the Northern District of California, Jun. 14, 2012, (142 pages).
Krill, Paul, "Socks to accommodate multicasting, multimedia apps," InfoWorld.com NEWS, vol. 21, Issue 40, (retrieved from http://web.archive.org/web/20000312222300/ . . . ), Jang Deposition Exhibit No. 38, CTP00030059, Oct. 4, 1999 (1 page).
Marsan, Carolyn Duffy, "Veteran protocol lands new role as multimedia star," Network World, (retrieved from http://web.archive.org/web/20000118142149/http:/www.networkworld.com/news/1999/0927socks.html), Jang Deposition Exhibit No. 39, CTP00030055, Sep. 27, 1999 (4 pages).
Jang, Saqib, "System and Method for Security and Management of Streaming Data Communications on a Computer Network System," original filing of USPTO U.S. Appl. No. 60/191,819, Jang Deposition Exhibit No. 45, Mar. 24, 2000 (23 pages).
International Telecommunications Union, "ITU-T Recommendation H.323 : Packet-based multimedia communications systems" Feb. 1998, (128 pages).
Wire One Technologies, "Business Incentives IP Video Communication Network Communication," Application Diagram, Jan. 18, 2001, 1 page, GLOW-00000001.
Sutcavage, Al, "Glowpoint Application Design Examples," Power Point, Nov. 2002, 16 pages, GLOW-00000004-19.
Perey, Christine, "Total Cost of Ownership: A comparison of in-house versus hosted videoconferencing implementations," Research Paper, Perey Research & Consulting, 2002, 15 pages, GLOW-00000020-34.
Wainhouse Research, LLC, "Traversing Firewalls and NATs with Voice and Video Over IP," Research paper, Apr. 2002, 14 pages, GLOW-00000037-50.
Pundt, Richard A., "Response by enlighten technologies, inc. to Subpoena to Produce Documents, Information, Or Objects or to Permit Inspection of Premises in a Civil Action," submitted in connection with *Cisco Systems, Inc. v. Teleconference Systems, LLC, et al.* pending in the United States District Court for the Northern District of California, Civil Action No. 3:09-cv-01550-JSW, 15 pages, Oct. 1, 2010
Cisco Systems, Inc., et al., "Joint Invalidity Contentions," submitted in connection with *Cisco Systems, Inc. v. Teleconference Systems, LLC, et al.* pending in the United States District Court for the Northern District of California, Civil Action No. 3:09-cv-01550-JSW; and *Teleconference Systems, LLC v. Tandberg, Inc. et al.*, pending in the United States District Court for the Northern District of California, Civil Action No. 3:10-cv-01325-JSW, 113 pages, Nov. 19, 2010.
Cisco Systems, Inc., et al., "Joint Invalidity Contentions—Attachment A" submitted in connection with *Cisco Systems, Inc. v. Teleconference Systems, LLC, et al.* pending in the United States District Court for the Northern District of California, Civil Action No. 3:09-cv-01550-JSW; and *Teleconference Systems, LLC v. Tandberg, Inc. et al.*, pending in the United States District Court for the Northern District of California, Civil Action No. 3:10-cv-01325-JSW, 113 pages, Nov. 19, 2010.
Cisco Systems, Inc., et al, "Joint Invalidity Contentions—Attachment A-2," submitted in connection with *Cisco Systems, Inc. v. Teleconference Systems, LLC, et al.* pending in the United States District Court for the Northern District of California, Civil Action No. 3:09-cv-01550-JSW; and *Teleconference Systems, LLC v. Tandberg, Inc. et al.*, pending in the United States District Court for the Northern District of California, Civil Action No. 3:10-cv-01325-JSW, 113 pages, Nov. 19, 2010.
Edge Publishing, "All Communications to Provide IP Videoconferencing Over DSL; New Service to be First of Its Kind in the Industry—Company Business and Marketing," Edge: WorkGroup Computing Report, Jan. 24, 2000, 2 pages, CTP00000795-96.
Business Wire, "Ericsson H.323 Gatekeeper Now Commercially Available," Business Wire, Jul. 14, 1998, 3 pages, CTP00000797-99.
Cisco Systems, Inc., "Cisco Delivers Internet Infrastructure for Carrier-Class Voice Quality," Apr. 28, 1998, 3 pages, CTP00000884-86.
Cisco Systems, Inc., "Access VPNs for the Enterprise," 1999, 6 pages, CTP00000891-96.
Cisco Systems, Inc., "Cisco 6400 Series Quick Look," 1999, 2 pages, CTP00000897-98.
Cisco Systems, Inc., "Cisco MC3810 Multiservice Access Concentrator," 2000, 5 pages, CTP00000921-5.
Cisco Systems, Inc., "Multiservice Networking Cisco 2600/3600," 1999, 72 pages, CTP00001112-83.
Davies, Steven, "Traversal of non-Protocol Aware Firewalls & NATS," Internet Engineering Task Force, Internet Draft, Mar. 18, 2001, 32 pages, CTP00001206-37.
Nelson, Jim, "SIP-Ready to Deploy," Presentation, Fall VON, Sep. 28, 1999, 17 pages, CTP00001248-64.
Anglero, Thomas F., "The Intelligence of the Internet Telephony Network," webpage, Jun. 29, 1998, 1 page, CTP00001265.
Fvc.com, "Broadband Video Services," brochure, 1999, 4 pages, CTP00001287-90.
Fvc.com, "Qwest Selects Fvc.com Video Services Solution," webpage, Feb. 29, 2000, 2 pages, CTP0001295-96.
International Telecommunication Union, "Packet-based multimedia communications systems," ITU-T Recommendation H.323, Sep. 1999, 170 pages, CTP00001479-648.
Korpi, Markku, et al., "Supplementary Services in the H.323 IP Telephony Network," IEEE Communications Magazine, Jul. 1999, pp. 118-125, CTP00001699-706.
Lambert, Peter, "The Works—Portals Reinvented: IP Service Switches Could Give CLECs Hosted-App Portal Power," webpage, Jul. 1, 1999, 3 pages, CTP00001721-23.
Milkowski, Forrest, "Application Service Providers," VON Conference Fall '99, Atlanta, Georgia, 1999, 19 pages, CTP00001724-42.
Ridgeway Systems & Software, "Next Generation IP Conferencing Services," White Paper, 1999, 11 pages, CTP00001757-67.
Bellsouth, "Spectrus® Multipoint Video Conferencing Service Operational & Performance Specifications," Technical Reference, TR 73566, Issue B, May 1995, 24 pages, CTP00001812-35.
Spring Tide Networks, Inc., "Service Intelligence for the New Public IP Network," brochure, Apr. 1999, 13 pages, CTP00001854-66.
Spring Tide Networks, Inc, "The IP Service Switch: Service Intelligence for the New Public IP Network," Product Description, Jul. 1999, 15 pages, CTP00001867-81.

\* cited by examiner

MULTIPLE SUBSCRIBER VIDEOCONFERENCING SYSTEM

CROSS REFERENCE TO RELATED APPLICATIONS

The present application is a divisional of U.S. patent application Ser. No. 09/819,548, filed on Mar. 26, 2001, which claims priority to U.S. Provisional Patent Application No. 60/191,819 entitled "System and Method for Security and Management of Streaming Data Communications on a Computer Network System," filed Mar. 24, 2000, the disclosures of which are herein incorporated by reference.

TECHNICAL FIELD

The subject matter disclosed herein relates generally to videoconferencing, and more particularly to a system, method, and device for implementing a multiple subscriber videoconferencing service for use on Internet Protocol (IP) networks.

BACKGROUND OF THE INVENTION

Videoconferencing provides a convenient way for users in distant locations to participate in a face-to-face meeting, without having to spend time and money traveling to a central meeting site. Many prior videoconferencing systems have been based on circuit switched Integrated Services Digital Networks (ISDN) standards. ISDN lines typically offer guaranteed quality of service, with specialized lines having high transmission rates. This enables high-quality video and audio signals to be delivered to the conferencing participants. However, ISDN videoconferencing is extremely expensive, because ISDN lines are costly to install and lease, and because specialized hardware is required at the sites of the users. Because of this expense, ISDN videoconferencing systems are typically offered in a specialized videoconferencing room, rather than at each desktop computer of each employee in an enterprise. In addition, ISDN can be complicated to set up, and unreliable. ISDN calls on average take more than 10 minutes to set-up, and greater than 10% of calls are dropped without being completed.

Recently, another approach to videoconferencing has emerged for use on packet-switched Internet Protocol (IP) networks, using the H.323 and Session Initiation Protocol (SIP) standards. H.323 is a standard approved by the International Telecommunication Union (ITU) in 1996 to promote compatibility in videoconference transmissions over IP networks. SIP is a proposed Internet Engineering Task Force (IETF) standard for multimedia communication over IP networks.

Videoconferencing over IP networks has a number of fundamental problems, including security, bandwidth utilization, quality of service, and deployment and management. Regarding security, H.323 and SIP are difficult to implement with current firewalls. The difficulty lies in the fact that H.323 and SIP are complex protocols and use multiple dynamically allocated ports for each call. Because of the heavy use of dynamically allocated ports, it is not possible to preconfigure firewalls to allow SIP- or H.323-signaled traffic without opening up large numbers of holes in the firewall. This represents a more lax firewall policy than would be acceptable at most enterprises. In addition, SIP or H.323 video endpoints behind a firewall typically cannot receive calls from external parties due to firewall policies in place at most enterprises.

Many enterprises also deploy Network Address Translation (NAT) devices, often implemented as part of a firewall application, to connect the enterprise network having private IP unregistered addresses to a public IP network with globally unique registered addresses. NAT is generally used for two purposes: 1) as a mechanism to work around the problem of IPv4 address space depletion, and 2) for security purposes (to hide internal IP addressing policy from outside entities. A NAT device rewrites IP headers as packets pass through the device. The NAT device maintains a table of mappings between IP addresses and port numbers. The problem with sending H.323 and SIP traffic through a NAT device is that these protocols make heavy use of embedded IP addresses, while normal data traffic contain IP address in the header of each packet. While configuring a NAT to rewrite packet headers to change addresses is relatively straightforward, it is very difficult to configure a NAT to translate addresses that are embedded in H.323 and SIP traffic, because the location of these address in these data stream is difficult to calculate.

Regarding bandwidth utilization, in order to achieve a quality sufficient for business videoconferencing, a minimum of 384 Kbps bandwidth is generally required per videoconferencing participant. Multiple users simultaneously engaged in videoconferencing applications may use up available bandwidth on a local area network (LAN), slowing down other critical network operations. Current systems do not allow a network administrator to control easily the bandwidth usage of multiple network users. Therefore, network administrators are reluctant to deploy videoconferencing systems.

Regarding quality of service, typical IP networks do not provide guaranteed transmission speeds for videoconferencing data. Videoconferencing data generally is indistinguishable from other data on IP networks, such as email and web page data. Data on IP networks may be delayed due to network congestion. While small delays are generally not a problem for less time sensitive data such as email, it can severely affect picture and audio quality for videoconference participants.

The above discussed issues lead to another problem with current videoconferencing systems, namely, that enterprises cannot easily outsource videoconferencing services to outside service providers. Currently, service providers are not able to cost-effectively provide videoconferencing services to a large number of subscribers, because specialized equipment must be deployed or existing equipment must be upgraded at every subscriber site. This results in an expensive up-front capital investment as well as significant operational expenses for the service provider. Up-front equipment installations take time at each subscriber, resulting in a slow deployment of the videoconferencing capabilities to subscribers. In addition, the high up-front costs result in decreased service provider profit margins. It is difficult to grow such a service because each subscriber adds to an incremental growth in the capital equipment pool because these resources are not shared.

Because of the cost and reliability issues with ISDN, and because of the security, bandwidth utilization, quality of service, and deployment and management issues with H.323 and SIP, it is difficult for the average enterprise to upgrade and customize its network to enable videoconferencing. In addition, it is difficult for service providers to cost-effectively provide an outsourced videoconferencing service on a per-subscriber basis. Thus there exists a need for a videoconferencing system, method, and device for delivering secure, high-quality videoconferencing services over an IP network to multiple enterprise subscribers in a manner that does not require expensive upgrading and customization of the enterprise network.

SUMMARY

A system, method, and device for use in videoconferencing are provided. The method typically includes installing a videoconferencing switch at an access point to an IP network, and registering a plurality of subscribers for videoconferencing services. Each subscriber typically has a plurality of endpoints. The method further includes receiving subscriber-specific settings to be applied to multiple videoconferencing calls from the plurality of endpoints associated with each subscriber. The method further includes storing the subscriber-specific settings at a location accessible to the switch, and configuring the switch to connect calls from the plurality of endpoints at each subscriber based on the corresponding subscriber-specific settings.

According to another embodiment of the subject matter disclosed herein, the method may include installing a video services switch on a service provider network at an access point configured to enable multiple enterprise subscribers to access a global packet-switched computer network to exchange data, including videoconferencing data and non-videoconferencing data. The video services switch is typically configured to process videoconferencing data from multiple enterprise subscribers. The method further includes at the video services switch, receiving a request for a videoconferencing call from an origination endpoint of one of the multiple enterprise subscribers, and connecting the videoconferencing call to a destination endpoint, the videoconferencing call having associated videoconferencing data. The method may further include securing the videoconferencing call based on subscriber-specific security settings.

The device typically includes a control plane module configured to receive subscriber-specific videoconferencing call settings for each of a plurality of video services subscribers, the videoconferencing call settings being for multiple calls placed from each video services subscriber, and a data plane module configured to receive videoconferencing data streams from multiple subscribers and manage these videoconferencing data streams according to the subscriber-specific videoconferencing call settings for each subscriber.

The system typically includes a service provider network configured to enable users of multiple enterprise subscriber networks to transfer data via a global computer network, the service provider network having an access point. The system also includes a videoconferencing services switch located on the access point of the service provider network. The videoconferencing services switch is configured to process videoconferencing calls from terminals on each of the multiple subscriber networks, based on subscriber-specific settings.

DETAILED DESCRIPTION

Figure 1:
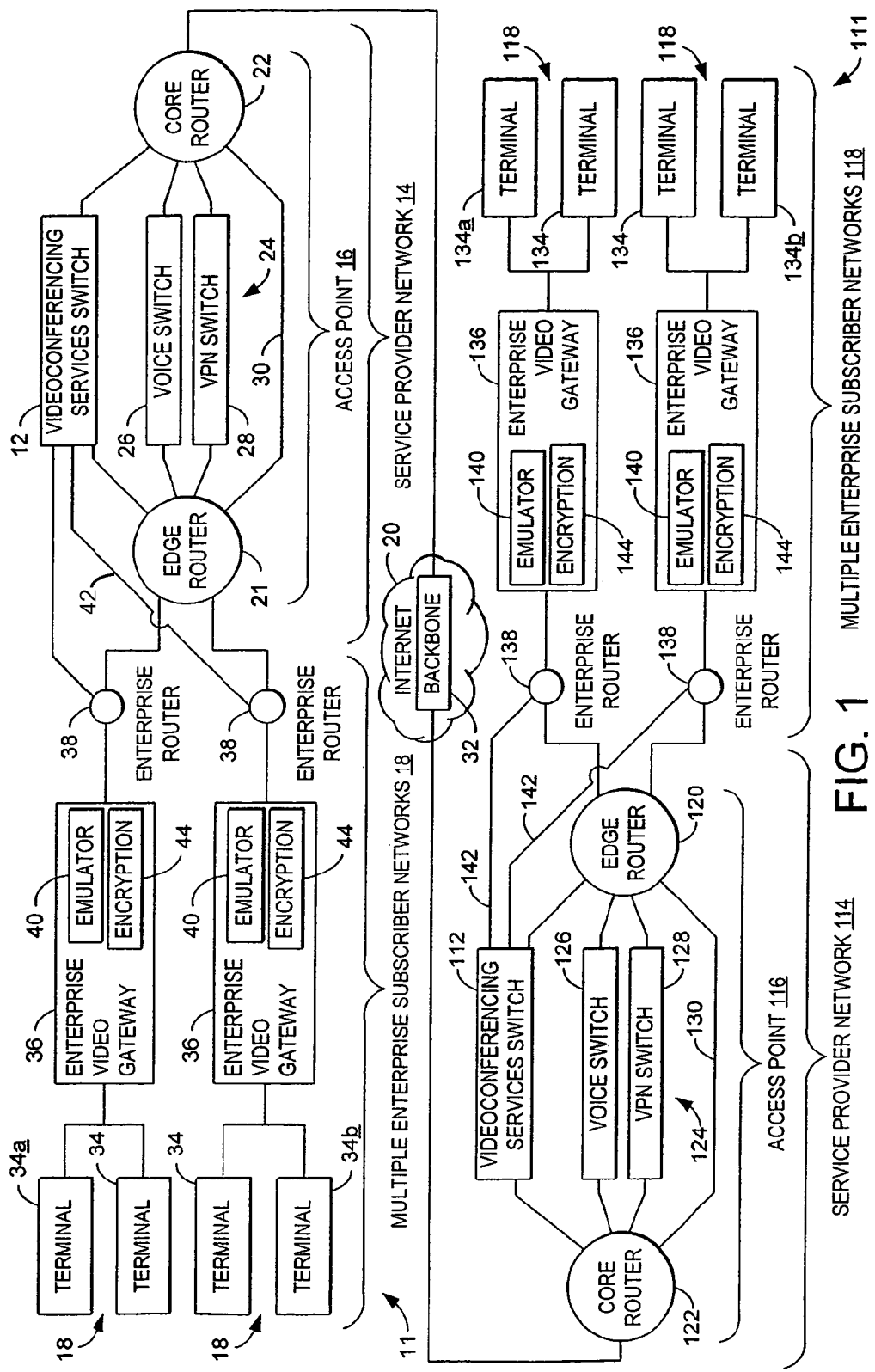
FIG. 1 is a schematic view of a videoconferencing system according to one embodiment of the subject matter disclosed herein.

Referring initially to FIG. 1, a videoconferencing system according to one embodiment of the subject matter disclosed herein is shown generally at 10. System 10 typically includes a videoconferencing services switch (VSS) 12 positioned on a service provider network 14 at an access point 16, typically a point of presence (POP). Switch 12 is configured to register multiple enterprise subscriber networks 18 for videoconferencing services, receive subscriber-specific settings for each subscriber 18 related to security and management of the videoconferencing calls from that subscriber, and process videoconferencing calls from each subscriber based on the associated subscriber-specific settings.

Service provider network 14 typically includes a packet-switched Internet Protocol (IP) network through which multiple enterprise subscriber networks 18 may access a global IP network 20, such as the Internet 20. Typically, the service provider network 14 includes an access point 16, such as a POP 16. The POP has a unique IP address and/or dial-up telephone number that a device on the enterprise subscriber network 18 may contact to access network 20.

POP 16 typically includes an edge router 21 and a core router 22 configured to route IP traffic into and out of POP 16. POP 16 also includes a plurality of services switches 24, including videoconferencing services switch 12, described above, Voice Over Internet Protocol (VOIP) services switch 26, and Virtual Private Network (VPN) services switch 28. Upon instruction, edge router 21 is configured to route traffic coming into POP 16 to an appropriate services switch for service-specific processing, or to core router 22 via direct link 30. Core router 22, in turn, is configured to route traffic from either of the services switches 24, or from direct link 30 out to the Internet 20. The traffic may be routed across a metropolitan area or long-haul backbone, which may be leased or owned by the service provider.

Traffic coming into the POP can be classified into videoconferencing data and non-videoconferencing data. Videoconferencing data typically includes control data and streaming voice and audio data according to the H.323 or SIP standards. H.323 refers to International Telecommunications Union, Telecommunications Sector, Recommendation H.323 (version 1, published November 1996; version 2, published 1998, entitled, "Visual Telephone Systems and Equipment for Local Area Networks Which Provide a Non-guaranteed Quality of Service," the disclosures of which are herein incorporated herein by reference. SIP refers to Session Initiation Protocol Proposed Standard (RFC 2543), Internet Engineering Task Force (IETF) (published March 1999), the disclosure of which is incorporated herein by reference. Non-videoconferencing data includes, for example, email, web pages, VOIP traffic, VPN traffic, etc. Videoconferencing data is typically routed through POP 16 via videoconferencing services switch 12, while non-videoconferencing data is routed around the switch.

Each of enterprise subscriber networks 18 typically includes a plurality of terminals 34. Terminals 34, along with video conferencing service switch 12 and the various other components of system 10, are typically H.323 or SIP compliant. Terminals 34 are typically videoconferencing devices configured to display and record both video and audio. Terminals 34 may be desktop computers, laptop computers, mainframes and/or workstation computers, or other videoconferencing devices. Terminals 34 may also be described as "endpoints" in a videoconferencing call. The terminal 34a originating the videoconferencing call is referred to as an origination endpoint 34a, and the other terminals requested to join in the call are referred to as destination terminals, shown at 34b, 134a, 134b. Terminal 34b is a local zone destination terminal, while terminals 134a, 134b are remote zone destination terminals. Local and remote zones are defined below.

Each enterprise subscriber network 18 also typically includes an enterprise video gateway 36 and enterprise edge router 38. Enterprise edge router 38 is configured to route data traffic between terminals 34 and service provider network 14, based on source and destination IP addresses.

Enterprise video gateway 36 typically includes an emulation module 40 which emulates H.323/SIP call control and firewall functionality and an encryption module 44. The gateway also typically has a globally mutable IP address and is configured to manage secure communication between terminals 34 and the videoconferencing services switch 12. Typically, emulation module 40 appears to terminals 34 as H.323 gatekeeper/SIP proxy and H.323/SIP application proxy firewall which includes network address translation (NAT) capability, which hides internal addresses from outside devices.

Figure 10:
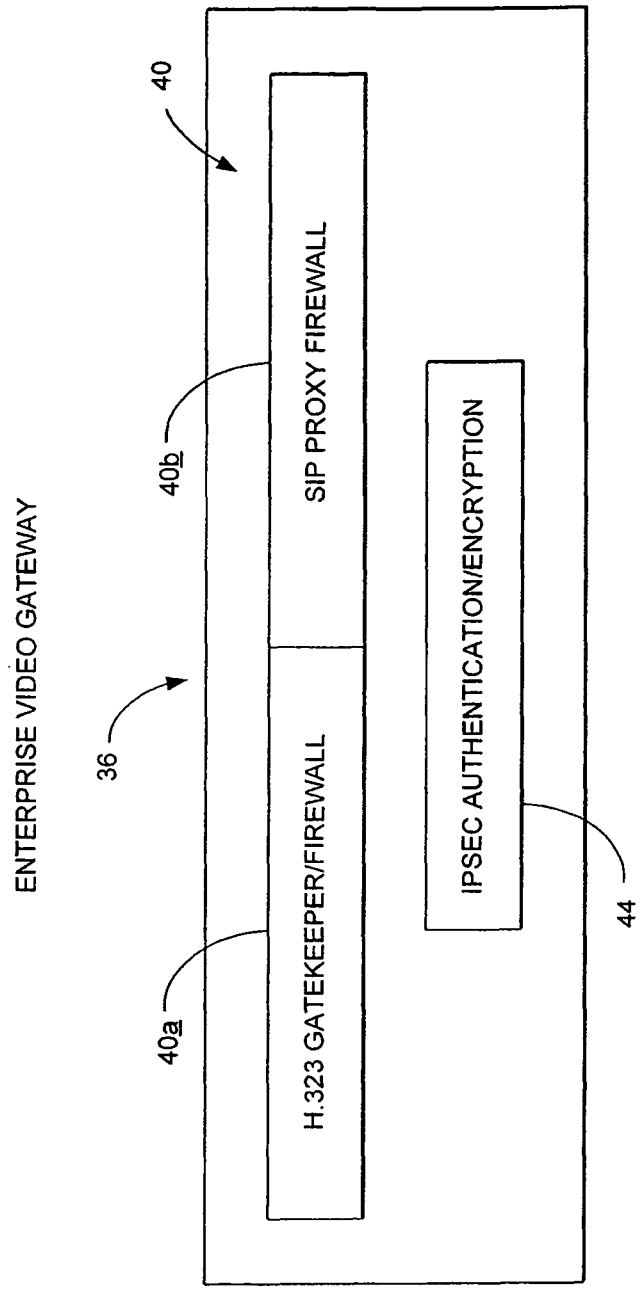
FIG. 10 is a schematic view of an enterprise video gateway of FIG. 1.

As shown in FIG. 10, enterprise video gateway 36 includes an encryption module 44. Encryption module 44 is typically an IP Security (IPSec) authentication and encryption module 44 configured to encrypt videoconferencing data coming from terminals 34 and send the encrypted data to videoconferencing switch 12. The IPSec protocols have been adopted by the Internet Engineering Task Force, and are described in the RFC 2411 entitled "IP Security Document Roadmap" (published Nov. 1998), the disclosure of which is herein incorporated by reference. By using IPSec, a Virtual Private Network (VPN) may be created between the gateway 36 and the switch 12. VPN refers to a network that is carried over public networks, but which is encrypted to make it secure from outside access and interference.

Videoconferencing data may be carried from terminal 34 to service provider network 14 via one of two routes. First, the videoconferencing data may be routed by enterprise router 38 via a direct network connection 42, such as a T1 connection, to the videoconferencing services switch 12 of the service provider network 14. In this case, the direct network connection is dedicated to video traffic. Second, firewall 40 may be configured to pass encrypted videoconferencing data through the firewall unexamined. Typically, the encrypted videoconferencing data is encrypted by the encryption module 44 of the enterprise video gateway 36 using the IPSec protocols, discussed above.

System 10 is divided into local metropolitan zone 11 and remote metropolitan zone 111 separated by backbone 32. Local metropolitan zone 11 includes all devices that connect to POP 16, and remote metropolitan zone 111 includes all devices that connect to POP 116. Components within remote metropolitan zone 111 are similar to those in local metropolitan zone 11 and are numbered correspondingly, and therefore will not be redescribed in detail.

System 10 may be configured to connect a two-party or multiparty videoconference call from an origination terminal 34a to a destination terminal 34b on local zone 11, and/or one or more destination terminals 134a and 134b on remote zone 111. A destination terminal on local zone 11 may be referred to as a local destination terminal, and a destination terminal on remote zone 111 may be referred to as a remote destination terminal.

Figure 2:
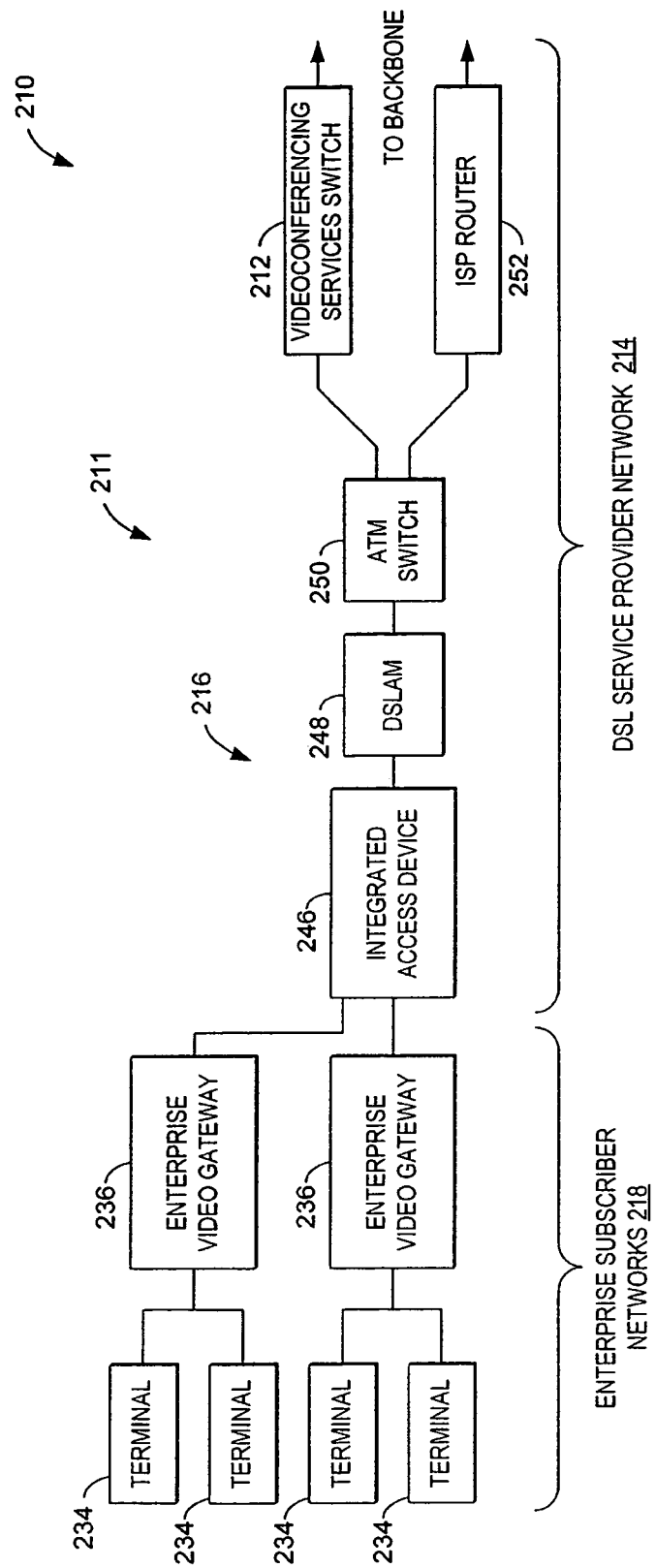
FIG. 2 is a schematic view of a videoconferencing system according to another embodiment of the subject matter disclosed herein.

FIG. 2 shows another embodiment of a videoconferencing system 210 having a local zone 211. It will be appreciated that a remote zone of system 210 is a mirror image of zone 211, similar to that described above for system 10. Local zone 211 includes multiple enterprise subscriber networks 218 linked to a Digital Subscriber Line (DSL) service provider network 214 via an access point 216, typically called a central office.

Each enterprise subscriber network 218 includes a plurality of terminals 234 which are similar to terminals 34 described above. Integrated Access Device (IAD) 246 is configured to receive traffic from enterprise subscriber networks 218 and forward the traffic to the Digital Subscriber Line Access Multiplexor (DSLAM) 248. The DSLAM is configured to multiplex the traffic from the IADs and forward it to Asynchronous Transmission Mode (ATM) switch 250, where the signals are demultiplexed for transmission over a long-haul backbone. ATM switch 250 is configured to route videoconferencing data to and from terminals 234 and the backbone via videoconferencing services switch 212, and non-videoconferencing data via ISP router 252, or another services switch.

Figure 3:
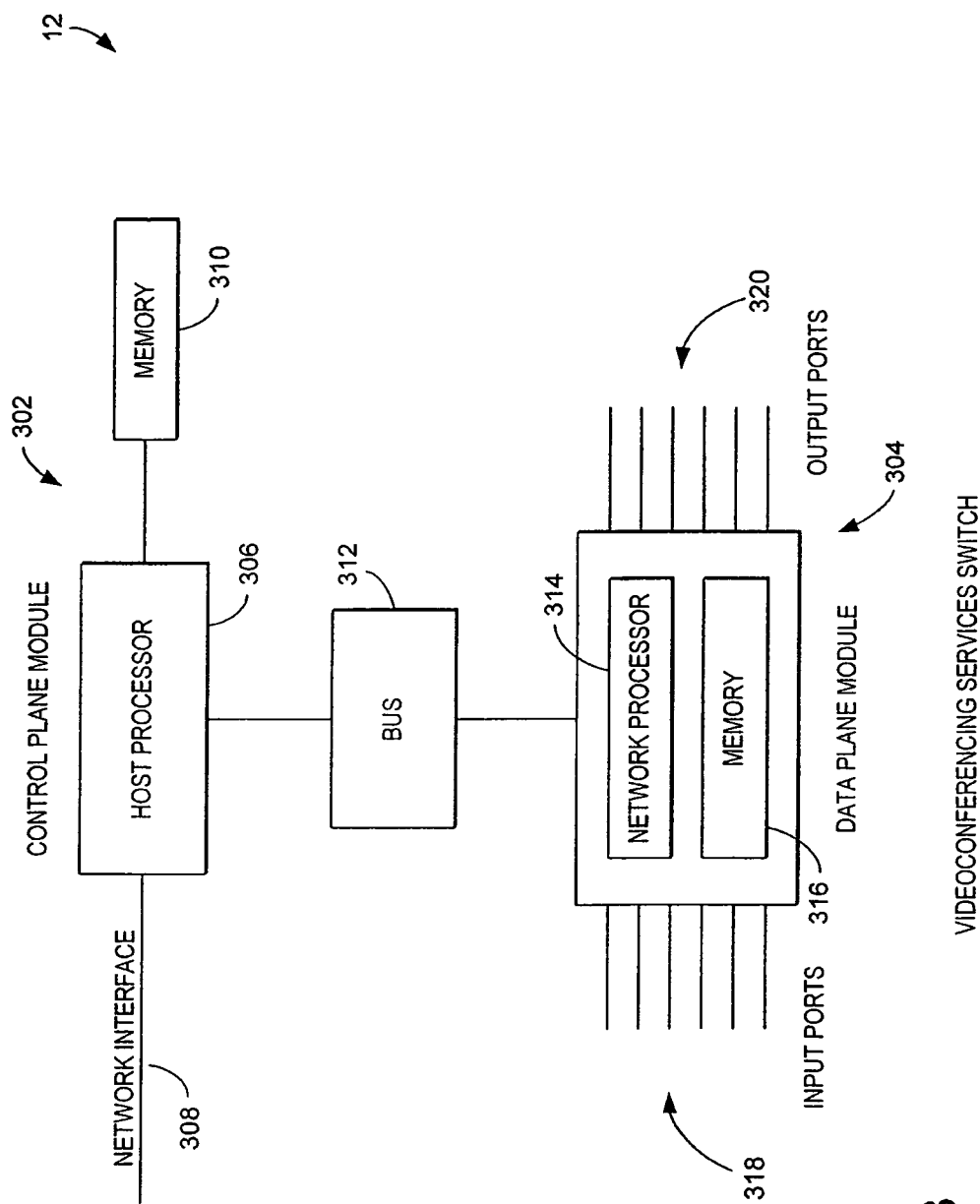
FIG. 3 is a schematic representation of a hardware configuration of a videoconferencing switch of FIG. 1.

FIG. 3 shows an exemplary hardware configuration for videoconferencing services switch 12. One switch that may be purchased and programmed to implement the subject matter disclosed herein is the Intel Exchange Architecture (IXA) WAN/Access switch, commercially available from Intel Corporation, of Santa Clara California and Radisys Corporation of Hillsboro, Oregon.

Switch 12 typically includes a control plane module 302 and a data plane module 304. Control plane module 302 includes a host processor, linked to an input/output network interface 308 and a memory 310. Typically, memory 310 includes RAM and ROM, although another form of memory may also be used, such as flash memory. Alternatively, a storage device such as a hard drive may also be attached to host processor 306. Control plane module 302 is configured to receive control data such as call set-up information through network interface 308, data plane ingress port 318, or data plane egress port 320. The call set-up information is processed according to H.323 or SIP specifications by host processor 306. Typically, the programs and data necessary for processing the call are stored in memory 310 and implemented by host processor 306. For example, the virtual muter, call control module, quality of service module, policy engine, and security module are typically stored in memory 310.

Control plane module 302 is linked to data plane module 304 via a bus 312. Data plane module 304 includes a network processor 314 and memory configured to receive and manage transfer of real-time audio and video data streams from ingress ports 318 to egress ports 320. Data plane module 304 typically includes a wire-speed switching fabric, capable of processing real-time data streams with virtually no appreciable latency.

The wire-speed switching fabric is configured to enable transport of streaming data traffic across system with virtually no appreciable latency, even as the streaming data traffic is processed and analyzed by system 10 to impose H.323/NATspecific firewall and NAT capabilities, policies from policy engine 418, monitor quality of service, and provide optional encryption and other security measures. One implementation of system 10 is configured to provide aggregate streaming data throughout of up to 1.048 Gbps with full security and policy management, quality of service management, and encryption. The wire-speed switching fabric includes full support for IETF standard IP routing protocols such as Open Shortest Path First (OSPF), Border Gateway Protocol (BGP), and Routing Information Protocol (RIP), which are well known in the networking arts. Support of these routing protocols will allow system 10 to forward video traffic appropriately to edge router 20 and core muter 22 in the service provider access point 116.

Figure 4A:
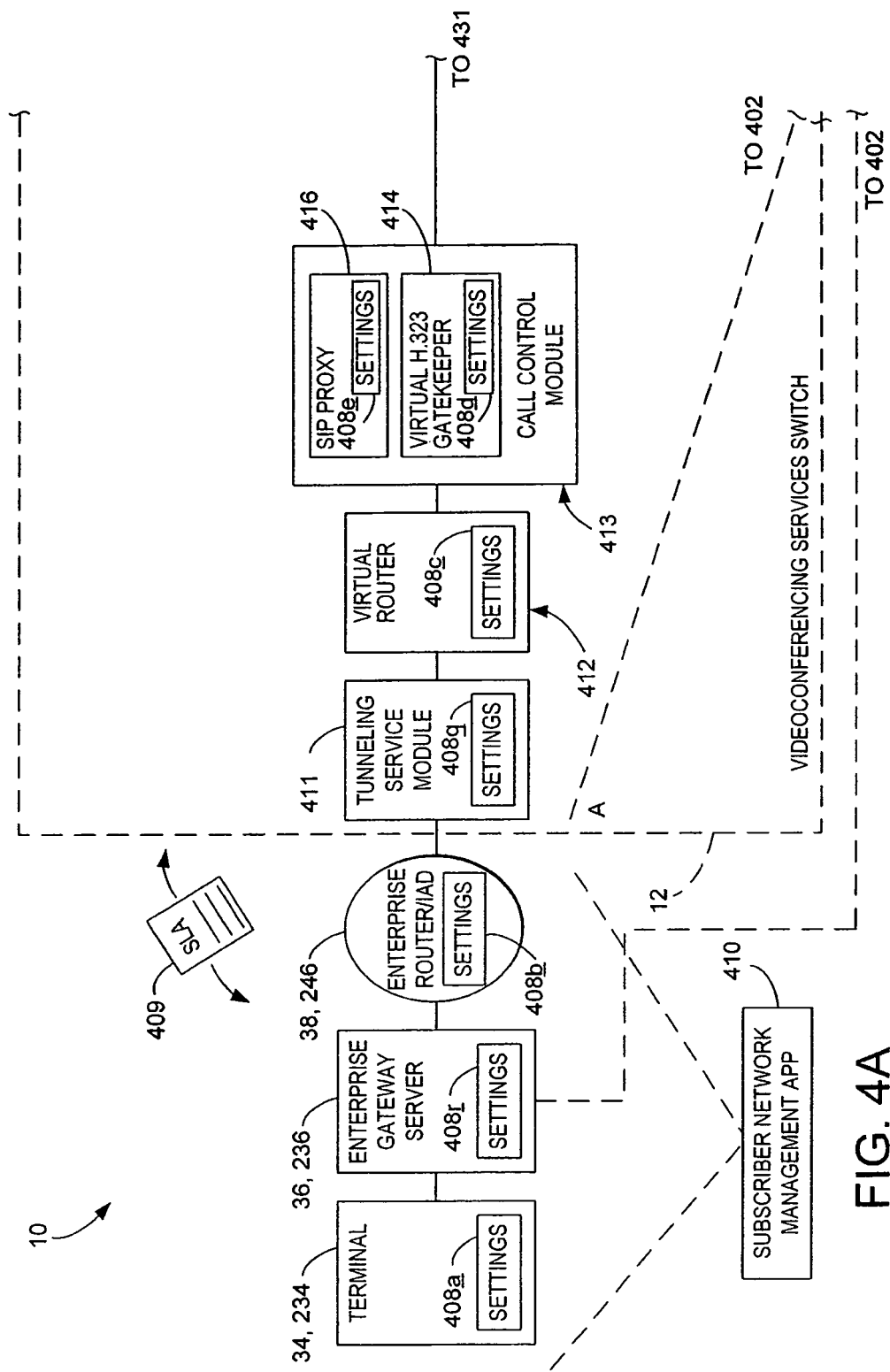
FIG. 4A is a software architecture of the videoconferencing system of FIG. 1.
Figure 4B:
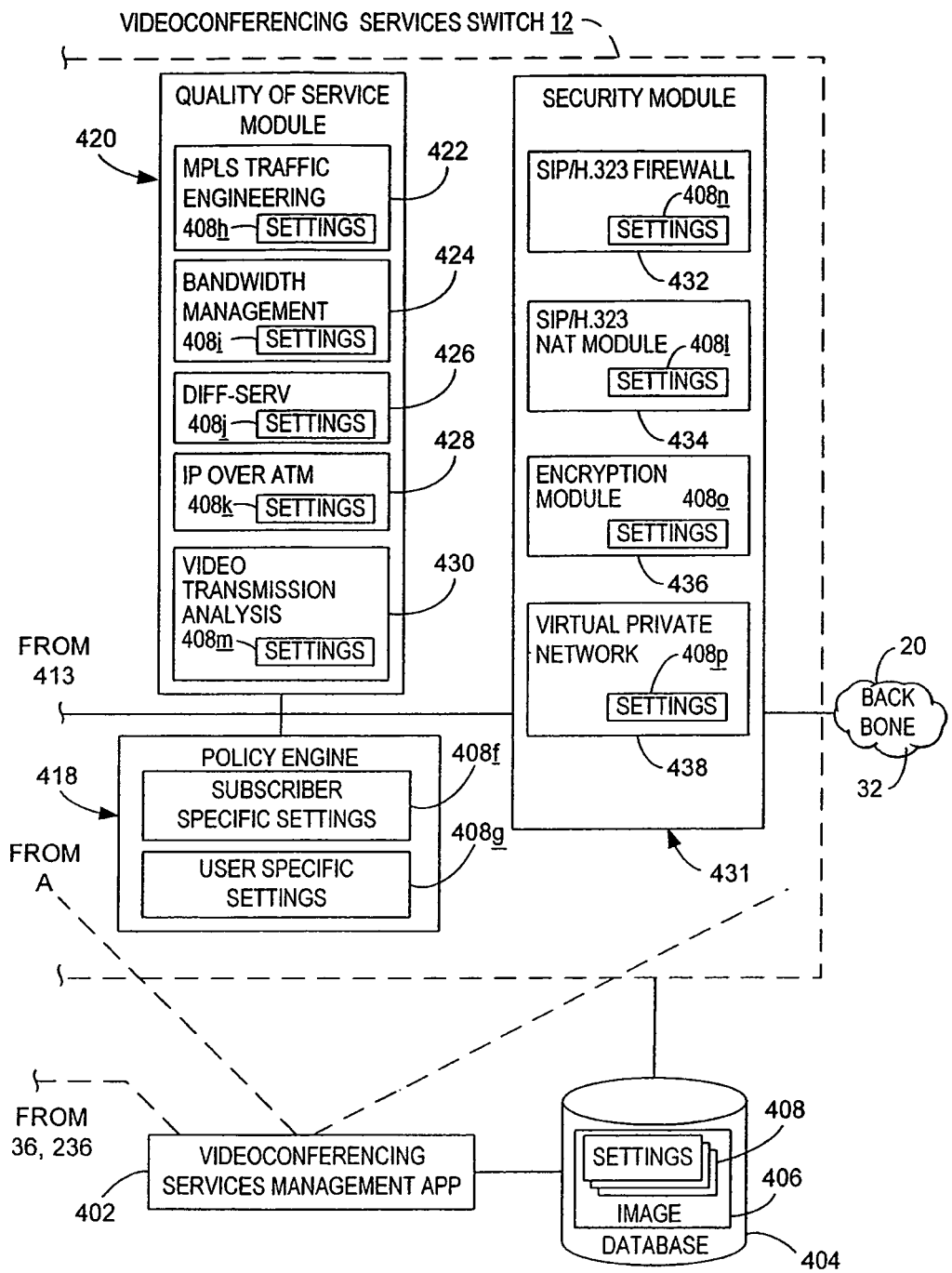
FIG. 4B is a continuation of the software architecture of FIG. 4A.

FIG. 4 shows a schematic view of the software components of videoconferencing system 10. Enterprise network 18 typically includes terminal 34 having terminal settings 408a, enterprise video gateway 36 having gateway settings 408r, and an enterprise edge router/IAD 38, 246 having enterprise router settings 408b. Settings 408a, 408r, and 408b are referred to as enterprise network resident settings, while the remaining settings 408c-408n, 408p are referred to as switch resident settings.

Terminal settings 408a typically include the IP address of the enterprise gateway, which acts as a proxy to the call control module 413 in videoconferencing switch 12. For calls placed with the H.323 protocol, the IP address of the enterprise gateway 36 (which also acts as a proxy to the videoconferencing services switch H.323 gatekeeper 414) is provided. For calls placed with the SIP protocol, the IP address of the enterprise gateway 36 (which also acts as a proxy to the videoconferencing services switch SIP proxy 416) is provided. Terminals use the IP address of the enterprise gateway for registration (using e.g. H.323 RAS signaling), call initiation (using e.g. H.323 ARQ signaling), and audio/video data exchange (using e.g. RTP/RTCP protocols). Users may optionally authenticate themselves with H.323 gatekeeper/SIP proxy. The enterprise gateway 36 encapsulates these messages in packets having the enterprise video gateway's globally routable IP address as the source address and forwards these messages to the call control module 413 in videoconferencing services switch 12. Typically, these packets are sent in an encrypted form using IPSec.

Enterprise video gateway settings 408r include secure communication channel settings. Typically, this includes instructions on how to create a secure communication channel between the enterprise gateway and the videoconferencing switch 12 according to the IPSec protocol, discussed above. Traffic sent using the IPSec protocol typically passes through firewall 40 unexamined. Adjusting settings 408r of the enterprise video gateway to enable IPSec authentication and encrypted data exchange with the video services switch may either be accomplished locally by the enterprise administrator or service provider personnel via subscriber network management application 410, or remotely via the video conferencing services management application 402.

Enterprise edge router settings 408b typically include the globally mutable IP address of the enterprise gateway 36, and the address of an H.323 gatekeeper 414 and/or SIP proxy 416 within the videoconferencing services switch 12. The enterprise edge router may also be configured to direct traffic from a terminal to the gatekeeper 414 or proxy 416 along direct connection 42. Enterprise edge router settings 408b may also include prioritization information for traffic passing though the edge router, such that the router may tag packets passing through with Diff-Serv labels or process packets based on Diff-Serv labels.

For DSL service provider network 112, shown in FIG. 2, terminal settings 408a are configured with the IP address of the call control module 413, as discussed above. IAD settings 408b are set to create a separate ATM permanent virtual circuit (PVC) or Frame Relay (FR) Data Link Communication Identifier (DLCI) for video traffic destined for the videoconferencing services switch. Optionally, the settings 408b may include priority settings for processing and delivery of video PVC/DLCI traffic.

Switch 12 typically includes a tunneling service module 411 having subscriber-specific settings 408q. The tunneling service module is configured to support secure communication channels from a multiple enterprise video gateways 36, using the IPSec protocol described above. The tunneling service module unencapsulates traffic from enterprise video gateways 36. It also maintains a dynamic mapping of IP address of each enterprise video gateway and port numbers so that the enterprise video gateway can correctly route call setup and video traffic back through to the appropriate enterprise video gateway.

Switch 12 typically includes a virtual router 412 configured to route requests from terminal 12 to call control module 413. Typically, at least one virtual router having a unique IP address is provided for each subscriber network 18. Traffic is routed between call control module 413 and enterprise video gateway/IAD 36, 246 based on settings 408c. The virtual router settings 408c typically include the address of enterprise edge router 38 or IAD 246, information about the dedicated physical connection 42, and or the POP edge router 20. Typically, a separate virtual router is provided for each enterprise subscriber. To configure the routing services, the switch provides BGP and OSPF routing on a per-virtual router basis. Thus, separate routing tables are maintained for each subscriber to segment its traffic.

Calls in the H.323 protocol are routed to virtual H.323 gatekeeper 414, while calls in the SIP protocol are routed to SIP Proxy 416. Call control module 413 is configured to perform call set-up operations, manage call data streams, and perform call tear-down operations.

Switch 12 also includes a policy engine 418 configured to enforce policies based on subscriber-specific settings on the videoconferencing calls. The policies may be based on subscriber-wide settings 408f that apply to all calls from a given subscriber, and user-specific settings that apply to only a single user or terminal of a given subscriber. Exemplary policies include outbound/inbound calling privileges, encryption policies, bandwidth policies, priority among users policies, participation privileges, inbound/outbound calling restrictions, time-of-day restrictions, audio or video restrictions. Each of these exemplary policies may be implemented on a per-user or per-subscriber basis. For example, a particular user may be able to use unlimited bandwidth, have a top priority among users, be allowed to both view and participate in calls, be able to both initiate outbound and receive inbound calls, from 8 am-6 pm Mon-Fri, and not be restricted to only audio or only video calling.

Switch 12 also includes a quality of service module 420 having a Multi Protocol Label Switching (MPLS) traffic engineering module 422 configured to create a network path engineered according to the MPLS standard. The MPLS architecture is described in the January 2001 Request For Comments entitled "Multiprotocol Label Switching Architecture," published by the Internet Engineering Task Force, the disclosure of which is herein incorporated by reference. Module 422 is configured to create secure MPLS tunnels that offer a guaranteed bandwidth for video traffic, based on subscriber-specific settings 408h. Settings 408h may include the desired bandwidth a subscriber has purchased, or the type of security to be applied to the MPLS traffic, etc.

Quality of service module 420 also includes a bandwidth management module 424 configured to manage the bandwidth allocated to each videoconferencing call and/or call participant. By managing the bandwidth based on subscriber-specific bandwidth settings 408i, network congestion can be avoided.

Quality of service module 420 also includes a differentiated services module 426 configured to implement differentiated services policy management according to the Differentiated Services standard described in the Definition of Differentiated Services Per Domain Behavior and Rules for their Specification, published by the Internet Engineering Task Force (January 2001), the disclosure of which is herein incorporated by reference. This typically includes labeling a precedence parameter for video traffic, i.e. RTP streams, stored in settings 408j.

Quality of service module 420 also includes an IP-over-ATM module 428 configured to send IP traffic over ATM switches, and settings 408k therefor. IP over ATM module is compliant with the standards described in Internet Engineering Task Force Request for Comments (RFC) 2684. Typically, settings 408k for IP-over-ATM module 428 are configured on a per-virtual router and per-physical interface basis.

Quality of service module 420 also includes a video transmission analysis engine 430 configured to analyze videoconferencing data carried by the switch for quality parameters specified in transmission analysis settings 408m. Exemplary quality parameters include packet loss, jitter, and latency.

Videoconferencing services switch 12 also typically includes a security module 431. Security module 431 typically includes a SIP/H.323 firewall 432, SIP/H.323 NAT module 434, encryption module 436, and Virtual Private Network (VPN) module 438. SIP/H.323 firewall 432 is configured to prevent unauthorized access to video services switch 402, and through it to subscriber networks. The firewall settings 408n of firewall 432 are configured on a per-subscriber basis, such that a subscriber-specific firewall may be custom-implemented for traffic from each subscriber. SIP/H.323 NAT module 434 is configured to provide network address translation services for traffic flowing through switch 12. NAT settings 408l are also subscriber-specific. VPN module 438 is configured to create a virtual private network for data flowing from switch 12 over network 20.

System 10 typically includes a videoconferencing services management application 402 configured to enable the service provider to adjust the switch-resident settings of videoconferencing services switch 12 and settings 408o of enterprise video gateway 36, 236. System 10 also includes a subscriber network management application 410, by which an administrator may adjust settings of devices on subscriber network 18, such as settings 408a on terminal 34, 134, 408b on enterprise router/IAD 38, 246. Typically, subscriber network administrator uses subscriber network management application 410 to adjust the settings of each terminal when the terminal is installed or reconfigured. Alternatively, terminal settings 410a may be set remotely by the service provider via videoconferencing services management application 402.

Videoconferencing services management application 402 is configured to interface with a database 404, which contains a database image 406 of records for subscriber-specific settings 408 for each of the multiple enterprise subscriber networks 18. Many of the subscriber-specific settings 408 are governed by a Service Level Agreement (SLA) 409. The SLA is an agreement executed between each enterprise subscriber and the service provider. The SLA contains terms for the level of videoconferencing service to be provided to a particular enterprise subscriber network. One exemplary term contained in the SLA is a video quality term, which indicates the maximum and/or minimum video quality the subscriber is to receive, either on a per-subscriber, per-user, or per-terminal basis. Often, video quality is defined as packet loss, jitter, and latency being within an acceptable predetermined range. While., typically, terminal settings 408a and enterprise router settings 408b are stored locally on enterprise subscriber network 18, it will also be appreciated that they may be stored on database 404. The switch resident settings are typically loaded into video services switch 12 periodically, such as once per day, by downloading database image 404 into memory of switch 12. The enterprise video gateway server settings 408r may be downloaded in a similar manner from database 404 via videoconferencing services management application 402.

Figure 5:
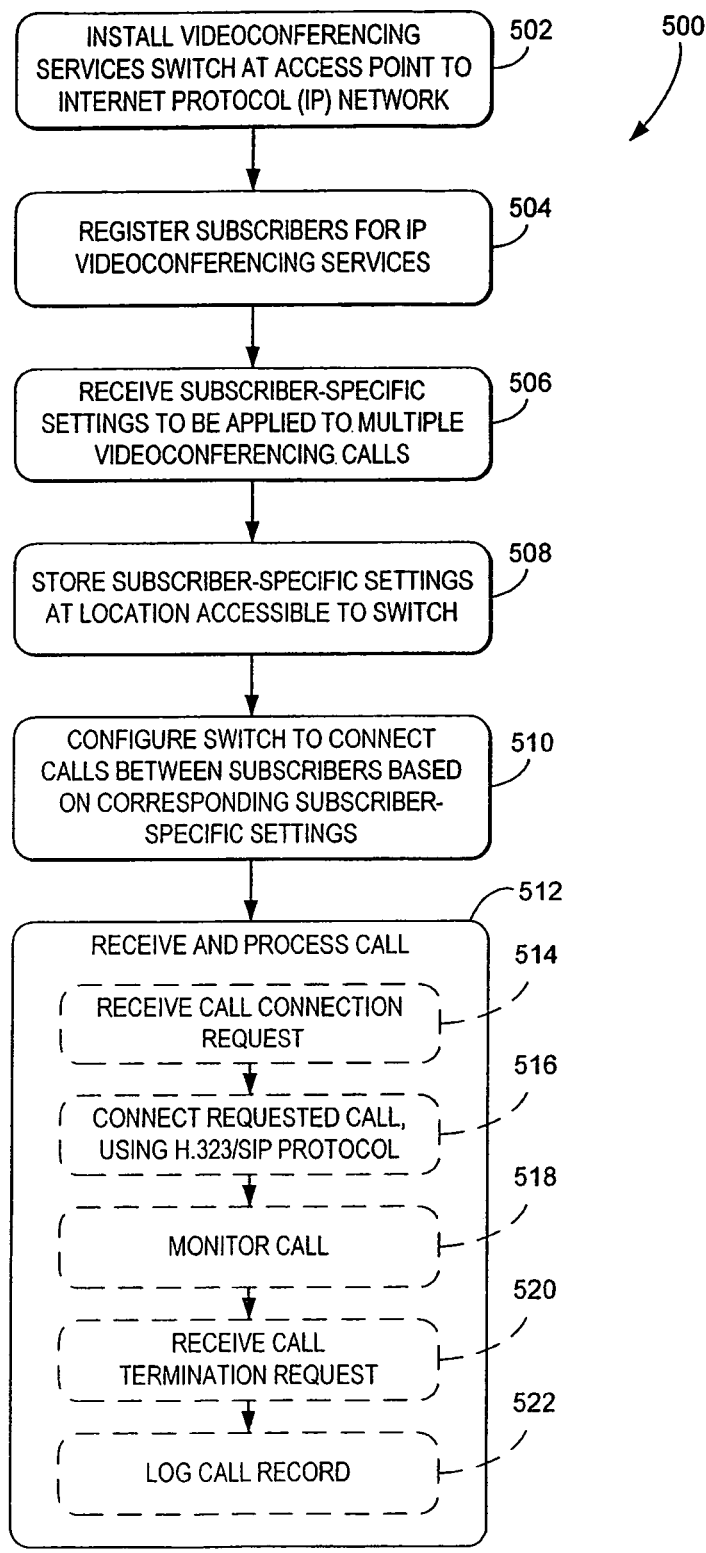
FIG. 5 is a flowchart of a videoconferencing method according to one embodiment of the subject matter disclosed herein.

In FIG. 5, a method according to one embodiment of the subject matter disclosed herein is shown generally at 500. Method 500 typically includes, at 502, installing a videoconferencing services switch (VSS) 12 at an access point 16 to an Internet Protocol (IP) network 20. At 504, the method typically includes switch 12 registering multiple enterprise subscriber networks 18 for IP videoconferencing services.

At 506, the method includes receiving subscriber-specific settings 408 to be applied to multiple videoconferencing calls originating from the subscriber. The subscriber-specific settings may be set and accessed by an administrator at an enterprise network and/or an administrator at service provider (SP) network 14 via management applications 402, 410, described above. At 508, the method further includes storing subscriber-specific settings at a location accessible to switch 12. Typically, the subscriber-specific settings are stored on switch 12 and enterprise video gateway 36, and in database 404. Certain subscriber-specific settings 408 may also be stored on terminal 34 and enterprise router 38, as described above.

At 510, method 500 includes configuring switch 12 to connect videoconferencing calls between subscribers based on corresponding subscriber-specific settings. Step 510 is typically accomplished via steps 602-620, described below.

At 512, the method further includes receiving and processing a videoconferencing call at switch 12. Typically, a user at a terminal 34 at enterprise subscriber network 18 initiates a call connection request for a videoconferencing call with a user at a destination terminal, such as remote destination terminals 134a, 134b or local destination terminal 34b. The call connection request typically includes pertinent information such as the origination and destination party address.

Step 512 is typically accomplished by, at 514, receiving the call connection request at switch 12 and proceeding to connect the requested call by using the H.323 or the Session Initiation Protocol (SIP) protocol at 516. The protocol used is determined by the subscriber-specific settings, or by the call request itself.

Once the call connection request is processed and videoconferencing is occurring, at 518, the method includes monitoring the established videoconferencing call. Switch 12 may monitor or record call information related to videoconferencing such as quality, duration of call, etc.

Typically, when the user wishes to end the videoconferencing call, the user will send a call termination request. The method includes receiving the call termination request at 520. The method further includes logging the videoconferencing call information in a call record at 522. The call record may serve to provide billing information to SP 14 and to obtain data for quality assurance purposes. The call record may include length of call, parties on the call, bandwidth used by the call, measured quality of the call (as determined for example by jitter, latency, and packet loss), among other parameters.

Figure 6:
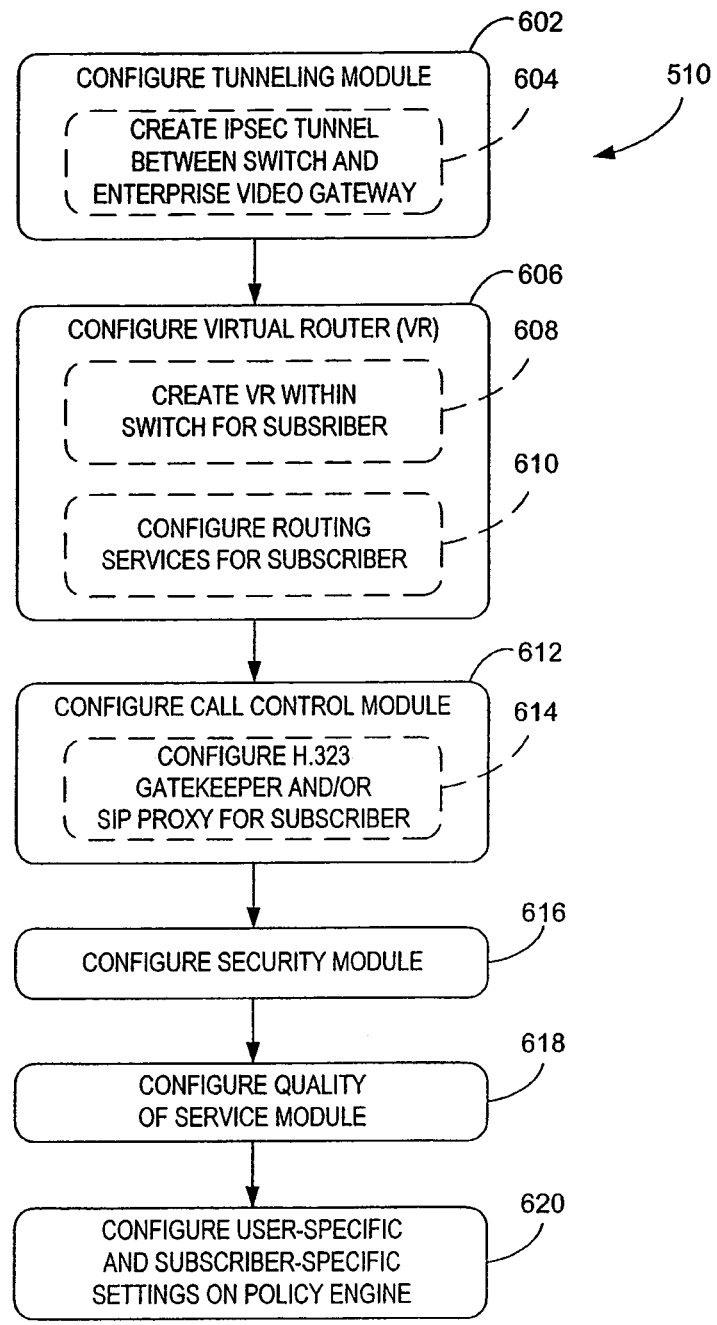
FIG. 6 is a flowchart of one exemplary method for accomplishing the step of configuring the switch of the method of FIG. 5.

Referring to FIG. 6, configuring switch 12, at 510, to connect videoconferencing calls includes configuring various components and modules as shown. At 602, step 510 includes configuring a tunneling module, which includes at 604, creating an IPSec tunnel between switch 12 and gateway 36. This step requires setting up IPSec authentication and encryption parameters on switch 12, as described. The tunneling module unencapsulates traffic from gateway 36 and maintains a dynamic mapping of IP address of servers 36 and port numbers, thus allowing gateway 36 to route call set-up correctly and video traffic back through the appropriate gateway 36.

Step 510 includes, at 606, configuring a virtual router (VR) 412, which includes, at 608, creating VR 412 within switch 12 for subscriber 18. Typically a subscriber edge router 20 is mapped onto switch 12. VR 412 is integral to module segmentation and layering architecture of switch 12.

Step 606 further includes, at 610, configuring routing services for subscriber 18, which includes the support of BGP and OSPF routing using VR 412. Typically routing tables are maintained for subscriber 18 to segment traffic.

Step 510 includes, at 612, configuring a call-control module. At 614, step 612 includes configuring H.323 gatekeeper 414 and/or SIP proxy 416 for subscriber 18. For H.323 gatekeeper 414, configuring gatekeeper 414 includes configuring a subscriber zone in gatekeeper 414, discovery and registration of endpoints, security, inter-gatekeeper communication, creation of records for billing and administrative purposes, etc. For SIP proxy 416, configuring proxy 416 includes discovery and registration of endpoints, information from Domain Name Service (DNS) server, creation of records, etc.

Step 510 further includes configuring security module at 616, configuring quality of service module at 618, and configuring user-specific and subscriber-specific settings on a policy engine 418 at 620.

Figure 7:
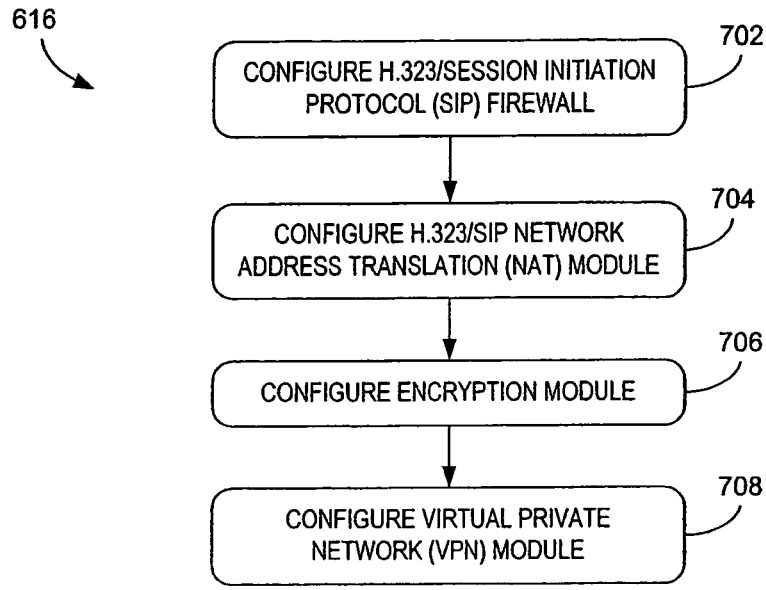
FIG. 7 is a flowchart of one exemplary method for accomplishing the step of configuring the security module of the method of FIG. 6.

Referring to FIG. 7, step 616 includes configuring H.323/SIP firewall 432 at 702. H.323/SIP applications parse control data to dynamically open and close ports for control traffic. Information obtained from parsing is sent to network data plane hardware 304. Configuring firewall 432 includes adding firewall address information into gatekeeper 414 for the zone, setting ports or channels that are statically open, and setting security logging.

Step 616 further includes configuring H.323/SIP network address translation (NAT) module at 704. For H.323 NAT module, the NAT module is configured to parse packet headers and payload of Q.931/H.245 control data streams during call set-up. For outgoing data, the NAT module is further configured to substitute non-routable endpoint source IP addresses and port numbers with its own globally unique H.323 proxy IP address and port numbers. For incoming data, the NAT substitutes non-routable, or internal endpoint destination IP addresses and port numbers by using stored IP address/port number mapping information.

Step 616 further includes configuring the encryption module at 706. Encryption is only used at certain enterprise subscribers 18 and destination IP addresses. For example, enterprises 18 may want encrypted communication with selected destination parties.

Lastly, step 616 includes configuring virtual private network (VPN) module at 708. Configuring VPN module includes configuring a subscriber VR with MPLS VPN capability including creation of VPN routing/forwarding tables. Step 708 further includes configuring BGP routing sessions, VR to SP edge-routing sessions, RIP/BGP/static route to subscriber edge-routing sessions, etc. By configuring switch 12 to support an MPLS VPN module, video-specific VPNs can exist across ATM, IP and L2-type backbone networks. In addition, subscribers to MPLS VPNs may be dynamically updated to enable simplified creation of extranet and intranet VPNs and site-to-site video traffic delivery.

Figure 8:
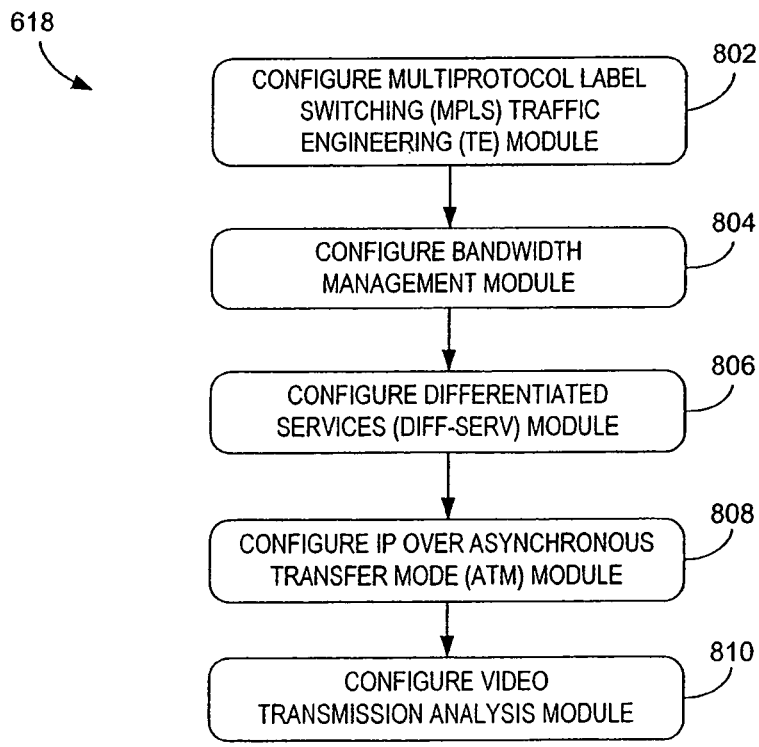
FIG. 8 is a flowchart of one exemplary method for accomplishing the step of configuring the quality of service module of the method of FIG. 6.

Referring to FIG. 8, step 618 of configuring quality of service module includes configuring an MPLS traffic engineering (TE) module at 802. Configuring switch 12 to support MPLS TE enables creation of premium-priced guaranteed bandwidth videoconferencing data paths across an SP MPLS backbone. Step 802 further includes configuring of MPLS tunnels, enabling of express forwarding of data, and enabling Intermediate System-Intermediate System (IS-IS) routing, as is commercially implemented in the products of Cisco Systems of San Jose, Calif. This is typically accomplished by adjusting settings 408h.

At 804 the method further includes configuring bandwidth management module 422, typically by adjusting settings 408i. This enables setting of maximum video bandwidth allowed into or from an enterprise subscriber by time of day.

At 806, the method further includes configuring differentiated services (Diff-Serv) module 426 at 806, typically by adjusting Diff Serv settings 408j. These settings may be used to configure the TOS/IP precedence field for video traffic (i.e. RTP streams) to/from each enterprise. This enables core devices in an SP network to give prioritized treatment to video traffic.

At 808, the method further includes configuring IP over asynchronous transfer mode (ATM) module, typically by adjusting settings 408k. IP over ATM services are configured on a per-virtual router and per-physical interface basis.

At 810, the method further includes configuring video transmission analysis module, typically by adjusting settings 408m. Configuration of size of jitter buffer within the videoconferencing services switch is accomplished on a per-enterprise subscriber basis.

Figure 9:
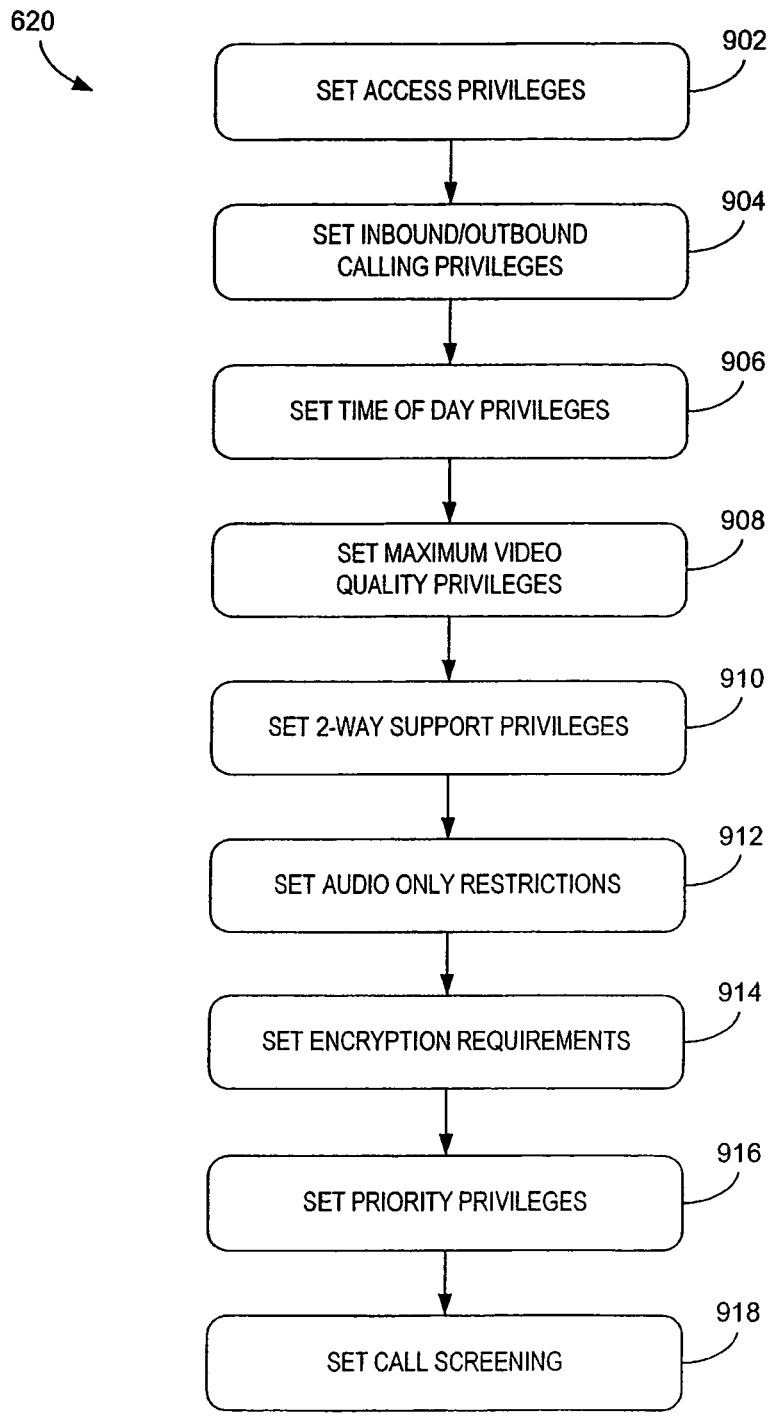
FIG. 9 is a flowchart of one exemplary method for accomplishing the step of configuring the user-specific and subscriber-specific settings of the method of FIG. 6.

FIG. 9 shows, in steps 902-918, one exemplary method of accomplishing step 620 of configuring user-specific and subscriber-specific policies on policy engine 418. The method typically includes, at 902, setting access privileges. Access privileges govern who can access the video system with user level and administrator level access privileges. At 904, the method includes setting inbound/outbound calling privileges on a per-user or per-subscriber basis. For example, every user in an enterprise may be prohibited from making outbound calls on company holidays, except upper management. At 906, the method typically includes setting time-of-day privileges per user or subscriber. For example, every user may be restricted from placing calls outside of regular business hours. At 908, the method typically includes setting maximum video quality privileges per user, or per subscriber.

At 910, the method typically includes setting 2-way support privileges. This allows a user to either send, receive, or both send and receive videoconferencing data pertaining to a call. At 912, the method includes setting audio-only restrictions on a per-user or per-subscriber basis. The method includes setting encryption requirements at 914. At 916, the method typically includes setting priority privileges on a per-user or per-subscriber basis. Videoconferencing data sent by a user with higher priority privilege will take precedence over other data sent by a user of lower priority, or over other lower priority data, such as email. At 918, the method typically includes setting videoconferencing call screening. This enables a user or subscriber to block incoming calls from a user-specified source. The policies set in step 620, and substeps 902-918 are typically saved as user-specific and subscriber-wide settings 408*f*, 408*g*.

While the subject matter disclosed herein has been particularly shown and described with reference to the foregoing preferred embodiments, those skilled in the art will understand that many variations may be made therein without departing from the spirit and scope of the subject matter disclosed herein as defined in the following claims. The description of the subject matter disclosed herein should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

We claim:

1. A videoconferencing services device, comprising:
    a call control module configured to provide control of videoconferencing calls in a service provider Internet Protocol (IP) network, the call control module comprising:
        an H.323 gatekeeper module configured to control calls placed with the H.323 protocol; and
        a Session Initiation Protocol (SIP) proxy module configured to control calls placed with the SIP protocol; and
    a videoconferencing security module coupled to the call control module, the videoconferencing security entity comprising:
        a firewall module configured to support both the H.323 and SIP protocols as needed on a per-call basis; and
        a network address translation module configured to provide network address translation services for a videoconferencing data stream, the network address translation module configured to support both the H.323 and SIP protocols as needed on a per-call basis,
    wherein the call control module and the videoconferencing security module are adapted for deployment at an access point of a service provider IP network.

2. The videoconferencing services device of claim 1, further comprising:
    a virtual router configured to route data from one or more enterprise subscriber networks to the call control module.

3. The videoconferencing services device of claim 2, wherein the virtual router uses a unique IP address for each enterprise subscriber network.

4. The videoconferencing services device of claim 2, wherein the virtual router is configured to route videoconferencing call data from an enterprise gateway in a first enterprise subscriber network to an enterprise gateway in a second enterprise subscriber network.

5. The videoconferencing services device of claim 4, wherein the virtual router is configured to route videoconferencing call data from an enterprise gateway having a public IP address that is routable across a global computer network.

6. The videoconferencing services device of claim 4, wherein the virtual router is configured to route videoconferencing call data from an enterprise gateway having a private IP address that is routable across a local network but not routable across a global computer network.

7. The videoconferencing services device of claim 6, wherein the enterprise gateway private IP address is mapped by the network address translation (NAT) module within the videoconferencing service device to a public IP address that is routable across a global computer network.

8. The videoconferencing services device of claim 1, further comprising:
    a policy engine configured to enforce policies based on subscriber-specific settings on the videoconferencing data stream.

9. The videoconferencing services device of claim 8, wherein the subscriber-specific settings are selected from the group consisting of:
    outbound/inbound calling privileges, encryption policies, bandwidth policies, priority among users policies, participation privileges, inbound/outbound calling restrictions, time-of-day restrictions, and audio or video restrictions.

10. The videoconferencing services device of claim 8, wherein the subscriber-specific settings are selected from the group consisting of:
    calling privileges, encryption, bandwidth, priority, participation, and restriction policies.

11. The videoconferencing services device of claim 1, further comprising:
    a quality of service module configured to provide bandwidth management for each videoconferencing data stream based upon subscriber-specific bandwidth settings.

12. The videoconferencing services device of claim 1, further comprising:
    a quality of service module capable of being configured to guarantee quality of service for videoconferencing calls placed via the device according to subscriber-specific settings.

13. The videoconferencing service device of claim 12, wherein the quality of service module comprises:
    a call bandwidth management module.

14. The videoconferencing service device of claim 12, wherein the quality of service module comprises:
    a call Multi-Protocol Label Switching (MPLS) traffic engineering module.

15. The videoconferencing service device of claim 12, wherein the quality of service module comprises:
    a call Differentiated Services (Diff Serv) capabilities module.

16. The videoconferencing services device of claim 1, further comprising:
    a security module capable of being configured to prevent unauthorized access to the enterprise subscriber network and to videoconferencing call data according to subscriber-specific settings.

17. The videoconferencing services device of claim 1 further comprising:
    a tunneling services module configured to receive encrypted traffic from enterprise subscriber networks and unencapsulate said traffic.

18. The videoconferencing services device of claim 17, wherein the encrypted traffic is received from enterprise subscriber networks through a virtual private network (VPN) that exists between the videoconferencing services device and each enterprise subscriber network.

19. A videoconferencing services device, comprising:
    a call control module configured to provide control of videoconferencing calls in a service provider Internet Protocol (IP) network, the call control module comprising:
        an H.323 gatekeeper module configured to control calls placed with the H.323 protocol; and a Session Initiation Protocol (SIP) proxy module configured to control calls placed with the SIP protocol;

a videoconferencing security module coupled to the call control module, the videoconferencing security entity comprising:
  a firewall module configured to support both the H.323 and SIP protocols as needed on a per-call basis; and
  a network address translation module configured to provide network address translation services for a videoconferencing data stream, the network address translation module configured to support both the H.323 and SIP protocols as needed on a per-call basis; and a quality of service module capable of being configured to guarantee quality of service for videoconferencing calls placed via the device according to subscriber-specific settings, wherein the call control module, the videoconferencing security module, and the quality of service module are adapted for deployment at an access point of a service provider IP network.

20. A videoconferencing services device, comprising:

a call control module configured to provide control of videoconferencing calls in a service provider Internet Protocol (IP) network, the call control module comprising:

an H.323 gatekeeper module configured to control calls placed with the H.323 protocol; and a Session Initiation Protocol (SIP) proxy module configured to control calls placed with the SIP protocol;

a videoconferencing security module coupled to the call control module, the videoconferencing security entity comprising:
  a firewall module configured to support both the H.323 and SIP protocols as needed on a per-call basis; and
  a network address translation module configured to provide network address translation services for a videoconferencing data stream, the network address translation module configured to support both the H.323 and SIP protocols as needed on a per-call basis; and a tunneling services module configured to receive encrypted traffic from enterprise subscriber networks and unencapsulate said traffic, wherein the call control module, the videoconferencing security module and the tunneling module are adapted for deployment at an access point of a service provider IP network.

* * * * *